US012771987B2

(12) United States Patent
Zhang et al.

(10) Patent No.: US 12,771,987 B2
(45) Date of Patent: Oct. 20, 2026

(54) EARPHONE AND TERMINAL DEVICE

(71) Applicant: Huawei Technologies Co., Ltd., Shenzhen (CN)

(72) Inventors: Tienan Zhang, Dongguan (CN); Cunshuai Liu, Dongguan (CN); Chao Xu, Shanghai (CN); Qiang Zhang, Dongguan (CN); Lin Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 18/714,977

(22) PCT Filed: Dec. 9, 2022

(86) PCT No.: PCT/CN2022/138109
§ 371 (c)(1),
(2) Date: May 30, 2024

(87) PCT Pub. No.: WO2023/124917
PCT Pub. Date: Jul. 6, 2023

(65) Prior Publication Data

US 2025/0030974 A1 Jan. 23, 2025

(30) Foreign Application Priority Data

Dec. 30, 2021 (CN) ......................... 202111661986.3

(51) Int. Cl.
*H04R 1/24* (2006.01)
*H04R 1/10* (2026.01)
(Continued)

(52) U.S. Cl.
CPC ............. *H04R 1/24* (2013.01); *H04R 1/1016* (2013.01); *H04R 1/1083* (2013.01);
(Continued)

(58) Field of Classification Search
CPC ...... H04R 1/1008; H04R 1/24; H04R 1/1016; H04R 1/1015; H04R 1/1083; H04R 1/22;
(Continued)

(56) References Cited

U.S. PATENT DOCUMENTS

| | | | | |
|---|---|---|---|---|
| 9,792,893 B1 * | 10/2017 | Gauger, Jr. | .......... | H04R 1/1083 |
| 2009/0220113 A1 * | 9/2009 | Tiscareno | .............. | H04R 1/403 381/380 |

(Continued)

FOREIGN PATENT DOCUMENTS

| | | | | |
|---|---|---|---|---|
| CN | 106231462 A | * 12/2016 | .............. | H04R 9/06 |
| CN | 206364985 U | * 7/2017 | | |

(Continued)

OTHER PUBLICATIONS

Lin Yu-Tzu et al., "Two-Way Piezoelectric MEMS Microspeaker with Novel Structure and Electrode Design for Bandwidth Enhancement", 2021 21st International Conference on Solid-State Sensors, Actuators and Micro Systems (Transducers), IEEE, Jun. 20, 2021 (Jun. 20, 2021), pp. 230-233, XP033952717, DOI: 10.1109/TRANSDUCERS50396.2021.9495444.

*Primary Examiner* — Carolyn R Edwards
*Assistant Examiner* — Kuassi A Ganmavo
(74) *Attorney, Agent, or Firm* — Slater Matsil, LLP

(57) ABSTRACT

In accordance with an embodiment, an earphone includes: a housing having a cavity structure disposed within, and a sound output port in communication with the cavity structure; and a first sound transducer, a second sound transducer, and a third sound transducer disposed in the cavity structure, wherein: a sound production frequency of the second sound transducer is greater than a sound production frequency of the third sound transducer and is less than a sound production frequency of the first sound transducer, and the third sound transducer is a micro-electro-mechanical-system
(Continued)

A-A located between the first sound transducer and the sound output port.

20 Claims, 17 Drawing Sheets

(51) Int. Cl.
*H04R 1/22* (2006.01)
*H04R 1/26* (2006.01)
*H04R 1/28* (2006.01)
*H04R 19/00* (2006.01)

(52) U.S. Cl.
CPC ......... *H04R 1/2846* (2013.01); *H04R 1/1008* (2013.01); *H04R 1/22* (2013.01); *H04R 1/26* (2013.01); *H04R 19/00* (2013.01); *H04R 2201/003* (2013.01); *H04R 2201/02* (2013.01)

(58) Field of Classification Search
CPC ........ H04R 1/26; H04R 1/2846; H04R 19/00; H04R 2201/003; H04R 2201/02
See application file for complete search history.

(56) References Cited

U.S. PATENT DOCUMENTS

| | | | | |
|---|---|---|---|---|
| 2012/0121119 | A1* | 5/2012 | Saggio, Jr. | H04R 1/1016 381/380 |
| 2014/0064550 | A1* | 3/2014 | Wiggins | H04R 29/001 381/391 |
| 2014/0205131 | A1* | 7/2014 | Azmi | H04R 1/1066 381/380 |
| 2017/0230741 | A1* | 8/2017 | Matsuo | H04R 5/033 |
| 2019/0058944 | A1* | 2/2019 | Gunawan | H04R 3/005 |
| 2019/0261078 | A1* | 8/2019 | Ouchi | H04R 1/1016 |
| 2023/0077689 | A1* | 3/2023 | Boothe | H04R 1/26 381/333 |

FOREIGN PATENT DOCUMENTS

| | | | | | |
|---|---|---|---|---|---|
| CN | 206713026 | U | | 12/2017 | |
| CN | 109892756 | A | | 6/2019 | |
| CN | 110062317 | A | * | 7/2019 | H04R 11/02 |
| CN | 112104936 | A | * | 12/2020 | H04R 1/1083 |
| CN | 112788469 | A | | 5/2021 | |
| CN | 213938285 | U | * | 8/2021 | |
| JP | 2013143735 | A | | 7/2013 | |
| WO | WO-2015178760 | A1 | * | 11/2015 | H04R 31/00 |
| WO | 2020156137 | A1 | | 8/2020 | |

* cited by examiner

A-A

EARPHONE AND TERMINAL DEVICE

CROSS-REFERENCE TO RELATED APPLICATIONS

This application is a national stage of International Application No. PCT/CN2022/138109, filed on Dec. 9, 2022, which claims priority to Chinese Patent Application No. 202111661986.3, filed on Dec. 30, 2021. Both of the aforementioned applications are hereby incorporated by reference in their entireties.

TECHNICAL FIELD

This application relates to the field of audio device technologies, and in particular, to an earphone and a terminal device.

BACKGROUND

In life, an earphone is a conversion unit that can convert a received electrical signal into an audible audio signal. Earphones are easy to carry and enable users to listen to audio alone without affecting another person. Therefore, the earphones are well favored by the users. Currently, with continuous improvement of quality of people's life, the users impose a higher requirement on sound quality of the earphone. The sound quality is an important indicator for measuring quality of the earphone, and a design of a sound production unit is an important factor that determines the sound quality.

A sound production unit is usually disposed in front cavity space of the earphone, and the sound production unit is a moving coil unit or a balanced armature unit. However, a single moving coil unit or a single balanced armature unit cannot meet a requirement of music for an entire frequency range of 20 Hz to 20 kHz, and generally has a disadvantage of insufficient response at a high frequency. To resolve this problem, one or more medium-high-pitch units are usually added to an existing moving coil unit to supplement medium-high-frequency response. However, in addition to an acoustic component, other components such as a feedback microphone, a battery, and a circuit board need to be disposed inside a wireless earphone. Due to limitations in an appearance of the wireless earphone, internal space of the wireless earphone is limited. If a plurality of medium-high-pitch units are disposed inside the earphone, there is no installation space for components such as the battery. Consequently, a solution of a plurality of sound production units cannot be applied to the wireless earphone.

SUMMARY

This application provides an earphone and a terminal device, to effectively ensure an output bandwidth of the earphone, and implement good full-frequency-band coverage effect and improved sound effect.

A first aspect of embodiments of this application provides an earphone, including a housing. There is a cavity structure in the housing, and a sound output port communicating with the cavity structure is provided on the housing; a first sound production unit, a second sound production unit, and a third sound production unit are disposed in the cavity structure, and a sound production frequency of the second sound production unit is greater than a sound production frequency of the third sound production unit and is less than a sound production frequency of the first sound production unit; and the third sound production unit is a micro-electro-mechanical system unit, and the third sound production unit is located between the first sound production unit and the sound output port.

According to the earphone provided in this embodiment of this application, the first sound production unit, the second sound production unit, and the micro-electro-mechanical system unit are disposed in the cavity structure. This can effectively ensure an output bandwidth of the earphone, and implement good full-frequency-band coverage effect and improved sound effect. In addition, the micro-electro-mechanical system unit is used as the third sound production unit. The micro-electro-mechanical system unit has a good transient vibration characteristic and a high vibration frequency. Therefore, compared with a conventional moving coil unit or a conventional balanced armature unit, the micro-electro-mechanical system unit has better high-frequency performance. This greatly improves sound quality of the earphone in a high frequency band.

In a possible implementation, the sound production frequency of the first sound production unit is less than or equal to 1 kHz; the sound production frequency of the second sound production unit ranges between 1 kHz and 6 kHz; and the sound production frequency of the third sound production unit is greater than 6 kHz.

In a possible implementation, a surface that is of the first sound production unit and that faces the sound output port and a part of an inner wall of the cavity structure form a front cavity, and a surface that is of the first sound production unit and that faces away from the sound output port and a part of the inner wall of the cavity structure form a rear cavity separated from the front cavity.

The micro-electro-mechanical system unit is disposed in the front cavity, a surface that is of the micro-electro-mechanical system unit and that faces the sound output port and a part of an inner wall of the front cavity enclose a first sound output channel communicating with the sound output port, and a part of the inner wall of the front cavity, a surface that is of the micro-electro-mechanical system unit and that faces away from the sound output port, and the surface that is of the first sound production unit and that faces the sound output port jointly enclose a middle cavity; and the first sound output channel communicates with the middle cavity.

According to the earphone provided in this embodiment of this application, the first sound output channel is provided, so that a high-frequency acoustic wave generated by the micro-electro-mechanical system unit can be propagated to an outer side of the sound output port. The middle cavity is provided, and the first sound output channel communicates with the middle cavity, so that a low-frequency acoustic wave emitted by the first sound production unit can be propagated to the outer side of the sound output port through the middle cavity and the first sound output channel.

In a possible implementation, a second sound output channel is provided between a part of the inner wall of the front cavity and a part of an outer wall of the housing, one end of the second sound output channel communicates with the sound output port, and the second sound output channel and the first sound output channel are separated and provided independently of each other; and there is first accommodation space that is in the cavity structure and that is capable of accommodating the second sound production unit, the first accommodation space communicates with both the rear cavity and the other end of the second sound output channel, and a sound output surface of the second sound production unit faces the second sound output channel.

According to the earphone provided in this embodiment of this application, the second sound output channel is provided, and the second sound output channel and the first sound output channel are separated and provided independently of each other, so that interference between a medium-frequency acoustic wave emitted by the second sound production unit and the high-frequency acoustic wave emitted by the third sound production unit can be avoided.

In a possible implementation, the first sound output channel includes a high-frequency sound output channel and a low-frequency sound output channel, and the high-frequency sound output channel and the low-frequency sound output channel are separated and provided independently of each other; and the middle cavity communicates with the low-frequency sound output channel.

According to the earphone provided in this embodiment of this application, the high-frequency sound output channel and the low-frequency sound output channel are separated and provided independently of each other, so that interference between the low-frequency acoustic wave emitted by the first sound production unit and the high-frequency acoustic wave emitted by the third sound production unit can be avoided.

In a possible implementation, a pipe support is disposed in the first sound output channel, one end of the pipe support is connected to the micro-electro-mechanical system unit in a sealing manner, and the other end of the pipe support extends in a direction close to the sound output port; a pipe inside the pipe support forms the high-frequency sound output channel; and a part of an outer wall of the pipe support and a part of an inner wall of the first sound output channel enclose the low-frequency sound output channel.

According to the earphone provided in this embodiment of this application, the pipe support is disposed, so that the micro-electro-mechanical system unit may be fastened on the pipe support. In this way, the micro-electro-mechanical system unit is conveniently assembled in the cavity structure, and the high-frequency sound output channel and the low-frequency sound output channel are conveniently separated and provided.

In a possible implementation, a feedback microphone is further included, and the feedback microphone is disposed in the first sound output channel and is close to the sound output port.

In a possible implementation, a positioning part is disposed on the outer wall of the pipe support, the feedback microphone is fastened on the positioning part, and a sound pickup port of the feedback microphone communicates with the low-frequency sound output channel.

According to the earphone provided in this embodiment of this application, the feedback microphone is disposed, so that the earphone can have a noise reduction function. In addition, the feedback microphone is disposed at a position close to the sound output port, so that the feedback microphone can conveniently pick up noise, thereby maximizing noise reduction performance of the feedback microphone.

In a possible implementation, there is a third sound output channel between a part of the inner wall of the front cavity and an outer edge of one end of the micro-electro-mechanical system unit, and the middle cavity communicates with the first sound output channel through the third sound output channel.

In a possible implementation, the second sound production unit is disposed in the first sound output channel, and the second sound production unit is located between the sound output port and the micro-electro-mechanical system unit.

According to the earphone provided in this application, the second sound production unit is disposed in the first sound output channel, so that the second sound production unit may be located at the sound output port. In this way, a distance from the second sound production unit to the sound output port can be reduced, acoustic mass in front of the second sound production unit can be reduced, medium frequency effect of the earphone can be optimized, and sound effect can be enhanced.

In a possible implementation, a sound pickup channel is provided between a part of the inner wall of the front cavity and an outer wall of the housing, and one end of the sound pickup channel communicates with the sound output port; there is second accommodation space in the cavity structure, and the second accommodation space communicates with both the rear cavity and the other end of the sound pickup channel; and a feedback microphone is disposed in the second accommodation space, and a sound pickup port of the feedback microphone faces the other end of the sound pickup channel.

According to the earphone provided in this embodiment of this application, the feedback microphone is disposed, so that the earphone can have a noise reduction function. In addition, the feedback microphone is disposed at a position close to the sound output port, so that the feedback microphone can conveniently pick up a sound inside the earphone or outside the earphone, thereby maximizing noise reduction performance of the feedback microphone.

In a possible implementation, the housing includes a front housing assembly and a rear housing assembly, and the front housing assembly is connected to the rear housing assembly; and one end of the front housing assembly has a sound output nozzle protruding outward, and one end of the sound output nozzle defines the sound output port.

In a possible implementation, the front housing assembly includes an inner housing and an outer housing, the outer housing is sleeved on the inner housing, and one end of the inner housing protrudes from one end of the outer housing to form the sound output nozzle; the outer housing is connected to the rear housing assembly; and one end that is of the inner housing and that faces away from the sound output nozzle is connected to the first sound production unit.

In a possible implementation, a channel is provided on one side of the inner housing, and the channel is used as a sound pickup channel of the feedback microphone, or the channel is used as a sound output channel of the second sound production unit.

According to the earphone provided in this embodiment of this application, the housing is disposed to include the front housing assembly and the rear housing assembly, so that the first sound production unit, the second sound production unit, and the micro-electro-mechanical system unit can be conveniently assembled inside the earphone.

In a possible implementation, a front vent hole is provided on the front housing assembly, and the front vent hole communicates with the front cavity, so that a front vent channel is formed between the front vent hole and the front cavity.

According to the earphone provided in this embodiment of this application, the front vent hole is provided, and the front vent hole communicates with the front cavity, so that the front cavity can communicate with a surrounding environment (namely, an external environment). In this way, when the earphone in this embodiment of this application is worn, air in an ear canal and the front cavity enters the front vent channel, and then enters the external environment through the front vent hole, so that an air flow in the front cavity is quickly discharged. In this way, pressure in the ear canal is quickly balanced, a problem of uncomfortableness caused in a process of wearing the earphone is avoided, and a problem of damage to an eardrum of a user is further avoided.

In a possible implementation, a rear vent hole is further provided on the front housing assembly, and the rear vent hole communicates with the rear cavity, so that a rear vent channel is formed between the rear vent hole and the rear cavity. According to the earphone provided in this embodiment of this application, the rear vent hole is provided, and the rear vent hole communicates with the rear cavity, so that the rear cavity can communicate with the surrounding environment (namely, the external environment). In this way, when the earphone in this embodiment of this application is worn, air in the ear canal and the rear cavity enters the rear vent channel, and then enters the external environment through the rear vent hole, so that an air flow in the rear cavity is quickly discharged. In this way, the pressure in the ear canal is quickly balanced, the problem of the uncomfortableness caused in the process of wearing the earphone is avoided, and the problem of the damage to the eardrum of the user is further avoided.

In a possible implementation, the second sound production unit is a planar film or a balanced armature unit.

In a possible implementation, the first sound production unit is a moving coil unit.

In a possible implementation, the earphone is a wireless Bluetooth earphone.

A second aspect of embodiments of this application provides a terminal device, including the foregoing earphone.

According to the terminal device provided in this application, the foregoing earphone is disposed. This can effectively ensure an output bandwidth of the earphone, and implement good full-frequency-band coverage effect and improved sound effect. In addition, the micro-electro-mechanical system unit is used as the third sound production unit. The micro-electro-mechanical system unit has the good transient vibration characteristic and the high vibration frequency. Therefore, compared with the conventional moving coil unit or the conventional balanced armature unit, the micro-electro-mechanical system unit has better high-frequency performance. This greatly improves the sound quality of the earphone in the high frequency band.

REFERENCE NUMERALS

Figure 1A:
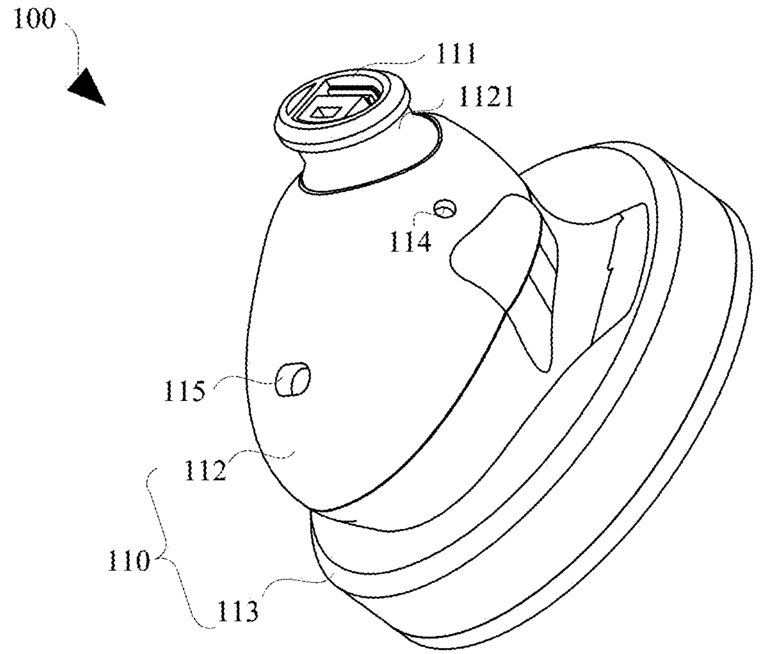
FIG. 1A is a schematic diagram of a structure of an earphone according to an embodiment of this application.

100: earphone;
110: housing; 120: cavity structure; 130: first sound production unit; 140: second sound production unit; 150: micro-electro-mechanical system unit; 150*a*: third sound production unit;
160: pipe support; 170: feedback microphone;
111: sound output port; 112: front housing assembly; 1121: sound output nozzle; 1122: inner housing; 1122*a*: channel; 1123: outer housing;
1123*a*: first end of the outer housing; 1123*b*: second end of the outer housing; 1124: pillar;
113: rear housing assembly; 1131: base; 1132: rear cover; 1133: hollow structure;
114: front vent hole; 115: rear vent hole;
121: front cavity; 1211: first sound output channel; 1211*a*: high-frequency sound output channel; 1211*b*: low-frequency sound output channel;
1212: third sound output channel;
122: rear cavity; 1221: second sound output channel; 1222: first accommodation space; 1223: a sound pickup channel;
1224: second accommodation space;
123: middle cavity; 171: sound pickup port;
200: smart wristband; 210: wristband; 220: wrist support; 230: device main body; 231: display.

DETAILED DESCRIPTION OF ILLUSTRATIVE EMBODIMENTS

Terms used in implementations of this application are merely used to explain specific embodiments of this application, but are not intended to limit this application.

Unless otherwise required by the context, throughout the specification and claims, a term “comprise (comprise)” and other forms such as a third person singular form “comprises (comprises)” and a present participle form “comprising (comprising)" are interpreted as "open and inclusive", that is, "comprise, but not limited to". In the description of the specification, terms such as "one embodiment (one embodiment)", "some embodiments (some embodiments)", "example embodiments (example embodiments)", "an example (example)", or "some examples (some examples)" are intended to indicate that a particular feature, structure, material, or characteristic related to the embodiment or example is included in at least one embodiment or example of the present disclosure. The schematic representations of the foregoing terms do not necessarily indicate a same embodiment or example. In addition, the particular feature, structure, material, or characteristic may be included in any one or more embodiments or examples in any appropriate manner.

In addition, in this application, orientation terms such as "front" and "rear" are defined relative to orientations of components schematically placed in the accompanying drawings. It should be understood that these orientation terms are relative concepts used for relative description and clarification, and may change correspondingly based on a change in an orientation in which the component is placed in the accompanying drawings.

A term "and/or" in embodiments of this application describes only an association relationship for describing associated objects and indicates that three relationships may exist. For example, A and/or B may indicate the following three cases: Only A exists, both A and B exist, and only B exists. In addition, a character "/" in this specification generally indicates an "or" relationship between the associated objects.

An embodiment of this application provides an earphone. The earphone may be used as an accessory of a terminal device in a call scenario. The terminal device includes but is not limited to a handheld device, a vehicle-mounted device, a wearable device, a computing device, or another processing device connected to a wireless modem. The terminal device may include a cellular phone (cellular phone), a smartphone (smartphone), a personal digital assistant (personal digital assistant, PDA) computer, a tablet computer, a laptop computer (laptop computer), a vehicle-mounted computer, a smart watch (smart watch), a smart wristband (smart wristband), a pedometer (pedometer), and another terminal device with a call function. In embodiments of this application, the terminal device may also be referred to as a terminal. The call scenario includes but is not limited to an indoor call scenario, an outdoor call scenario, and a vehicle-mounted call scenario. The call scenario may include a quiet call scenario, a noisy call scenario (for example, a street, a shopping mall, an airport, a station, a construction site, a rainy scenario, a game viewing scenario, or a concert), a cycling call scenario, a windy outdoor call scenario, a single-ear call scenario, a dual-ear call scenario, and another scenario in which a call can be performed. An earphone (earphone, also referred to as a headphone, a head-set, an earpiece) may be a pair of conversion units, and is configured to receive a telecommunication signal sent by a media player or a receiver and convert the telecommunication signal into an acoustic wave that can be heard by using a loudspeaker close to an ear.

Earphones can be generally classified into wired earphones (wired headphones or a wired headset) and wireless earphones (a wireless headset). The wired earphones have two earphones and a connection cable. Left and right earphones are connected through the connection cable. The wired earphones may be inconvenient to wear and need to be connected to the terminal device through an earphone jack. Power of the terminal device needs to be consumed in a working process. However, the wireless earphones may communicate with the terminal device by using a wireless communication technology (for example, a Bluetooth technology, an infrared radio frequency technology, a 2.4G wireless technology, or an ultrasonic wave). Being free from a constraint of a physical wire, compared with the wired earphones, the wireless earphones are more convenient to use, and therefore are developed rapidly. A left earphone of the wireless earphones may be connected to a right earphone through Bluetooth.

True wireless Bluetooth earphones are also referred to as true wireless stereo (true wireless stereo, TWS) earphones. The TWS earphones completely discard a cable connection manner and include two earphones (for example, primary and secondary earphones). For example, during use, the terminal device (which may also be referred to as a transmitting device, such as a mobile phone, a tablet, or a music player with a Bluetooth output) is wirelessly connected to the primary earphone, and then the primary earphone is connected to the secondary earphone in a Bluetooth wireless manner, so that Bluetooth left and right audio channels can be wirelessly separated for use. Left and right earphones of the TWS earphones can form a stereo system through Bluetooth, to improve music listening performance, call performance, and wearing performance. In addition, either of the two earphones can work independently. For example, when the primary earphone is not connected to the secondary earphone, the primary earphone may return to mono sound quality. Because the left and right earphones of the TWS earphones are not physically connected, almost all TWS earphones are equipped with charging cases that support both charging and storage functions.

Due to limitations in an appearance of the TWS earphone, internal space of the TWS earphone is limited. In addition, compared with the wired earphone, in addition to an acoustic component, other components such as a feedback microphone, a battery, and a circuit board need to be disposed inside the TWS earphone. Therefore, an acoustic component of a TWS earphone in some technologies is usually a low-frequency moving coil unit or a balanced armature unit. However, a single moving coil unit or a single balanced armature unit cannot meet a requirement of music for an entire frequency range of 20 Hz to 20 kHz. Consequently, a technical problem of poor sound quality generated by the TWS earphone is caused.

To resolve the foregoing problem, an embodiment of this application provides an earphone that can cover a full frequency band. The following uses a TWS earphone as an example for description. In another embodiment, an earphone in the following solution may alternatively be a wired earphone or the like.

Figure 2:
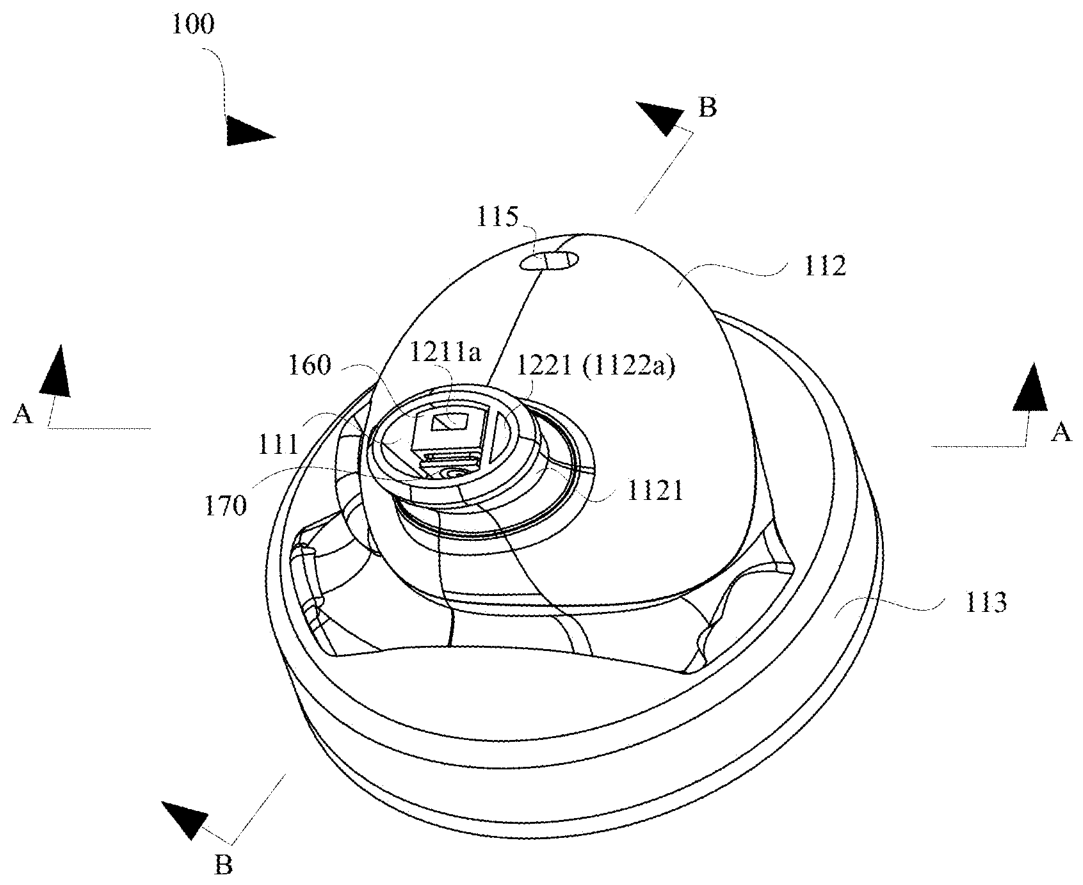
FIG. 2 is a schematic diagram of a structure of the earphone in FIG. 1A viewed from another angle.
Figure 3:
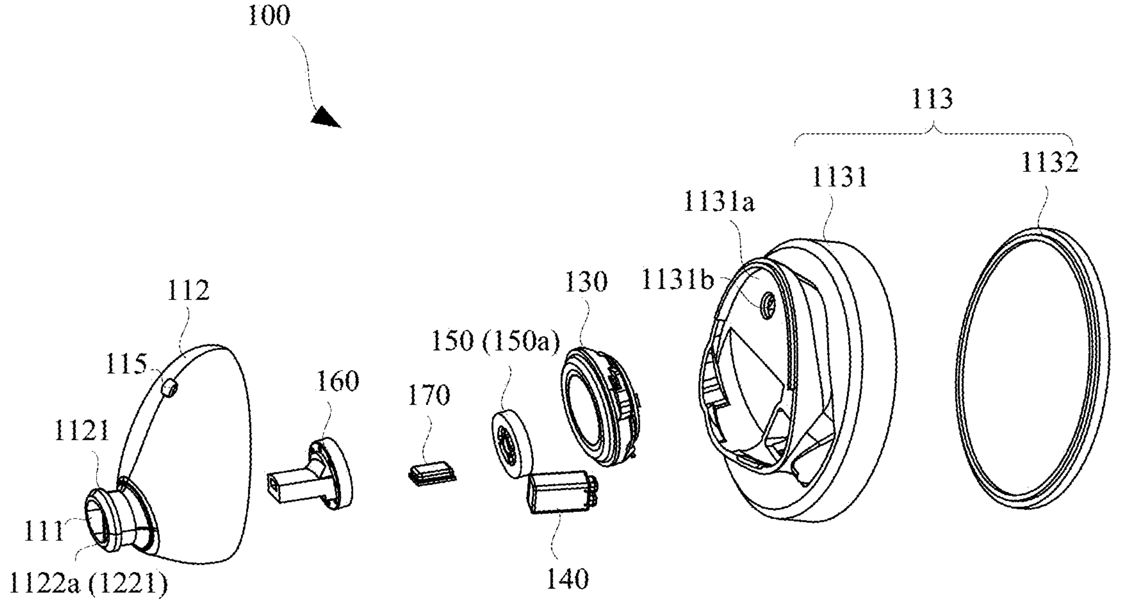
FIG. 3 is an exploded view of FIG. 1A.

FIG. 1A is a schematic diagram of a structure of an earphone according to an embodiment of this application. FIG. 2 is a schematic diagram of a structure of the earphone in FIG. 1A viewed from another angle. FIG. 3 is an exploded view of FIG. 1A.

As shown in FIG. 1A, FIG. 2, and FIG. 3, an embodiment of this application provides an earphone 100, including a housing 110. The housing 110 includes a front housing assembly 112 and a rear housing assembly 113. The front housing assembly 112 is connected to the rear housing assembly 113. One end of the front housing assembly 112 has a sound output nozzle 1121 protruding outward, and one end of the sound output nozzle 1121 defines a sound output port 111. In addition, as shown in FIG. 3, a first sound production unit 130, a second sound production unit 140, a third sound production unit 150*a*, a feedback microphone 170, and a pipe support 160 are disposed in space enclosed by the front housing assembly 112 and the rear housing assembly 113. The third sound production unit 150*a* is a micro-electro-mechanical system (Micro-Electro-Mechanical System, MEMS) unit 150.

In this embodiment of this application, a sound production frequency of the first sound production unit 130 is less than or equal to 1 kHz. Because the frequency is low, a sound signal within the frequency range may be referred to as a low-frequency sound signal. A sound production frequency of the second sound production unit 140 ranges between 1 kHz and 6 kHz. Because the frequency is between a low frequency and a high frequency, a sound signal within the frequency range may be referred to as a medium-frequency sound signal. A sound production frequency of the third sound production unit 150*a* is greater than 6 kHz. Because the frequency is high, a sound signal within the frequency range may be referred to as a high-frequency sound signal. Therefore, in this embodiment of this application, the sound production frequency of the third sound production unit 150*a*>the sound production frequency of the second sound production unit 140>the sound production frequency of the first sound production unit 130.

Figure 1B:
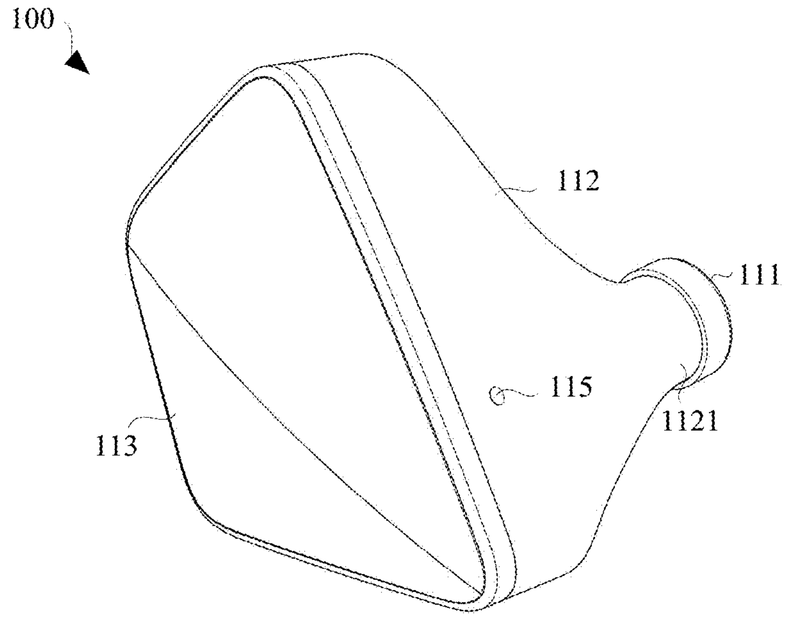
FIG. 1B is a schematic diagram of a structure of an earphone according to an embodiment of this application.
Figure 1C:
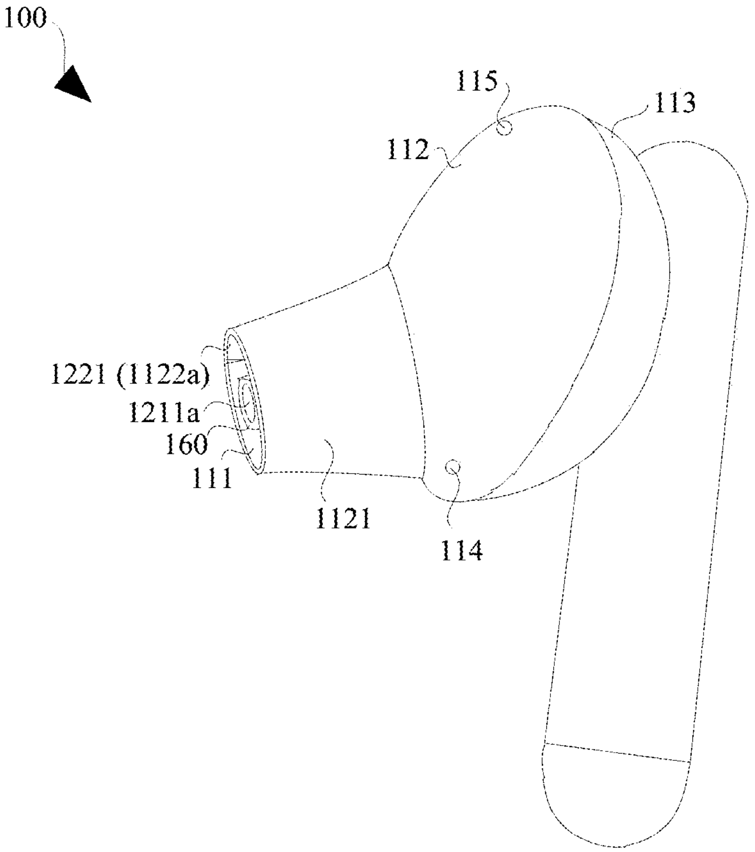
FIG. 1C is a schematic diagram of a structure of an earphone according to an embodiment of this application.
Figure 1D:
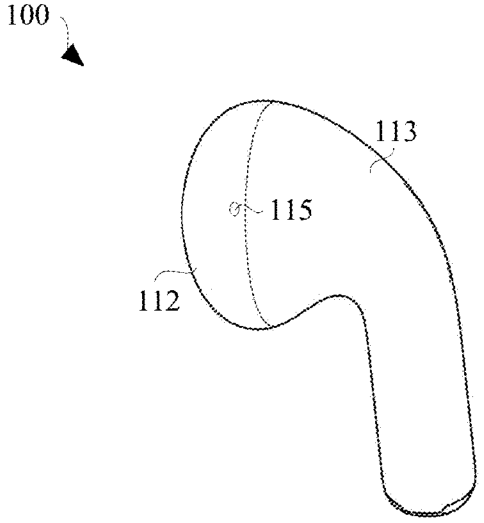
FIG. 1D is a schematic diagram of a structure of an earphone according to an embodiment of this application.

It may be understood that an appearance of the earphone 100 may be the structure shown in FIG. 1A, or may be another structure. For example, the earphone 100 may alternatively be the structure shown in FIG. 1B, the structure shown in FIG. 1C, the structure shown in FIG. 1D, or another appropriate structure. The appearance of the earphone 100 is not specifically limited in this embodiment of this application.

As shown in FIG. 3, the rear housing assembly 113 includes a base 1131 and a rear cover 1132. The base 1131 is disposed close to the front housing assembly 112. A baffle plate 1131*a* is disposed at one end that is of the base 1131 and that is close to the front housing assembly 112. A through hole 1131*b* is provided on the baffle plate 1131*a*. Two sides of the baffle plate 1131*a* are communicated through the through hole 1131*b*. The rear cover 1132 is disposed at one end that is of the base 1131 and that is away from the front housing assembly 112, and is fastened to the base 1131. The end that is of the base 1131 and that is close to the front housing assembly 112 may be fastened to the front housing assembly 112. A hollow structure 1133 is formed between the base 1131 and the rear cover 1132.

It should be noted that one end that is of the sound output nozzle 1121 and that is away from the rear housing assembly 113 is the sound output port 111.

Figure 4A:
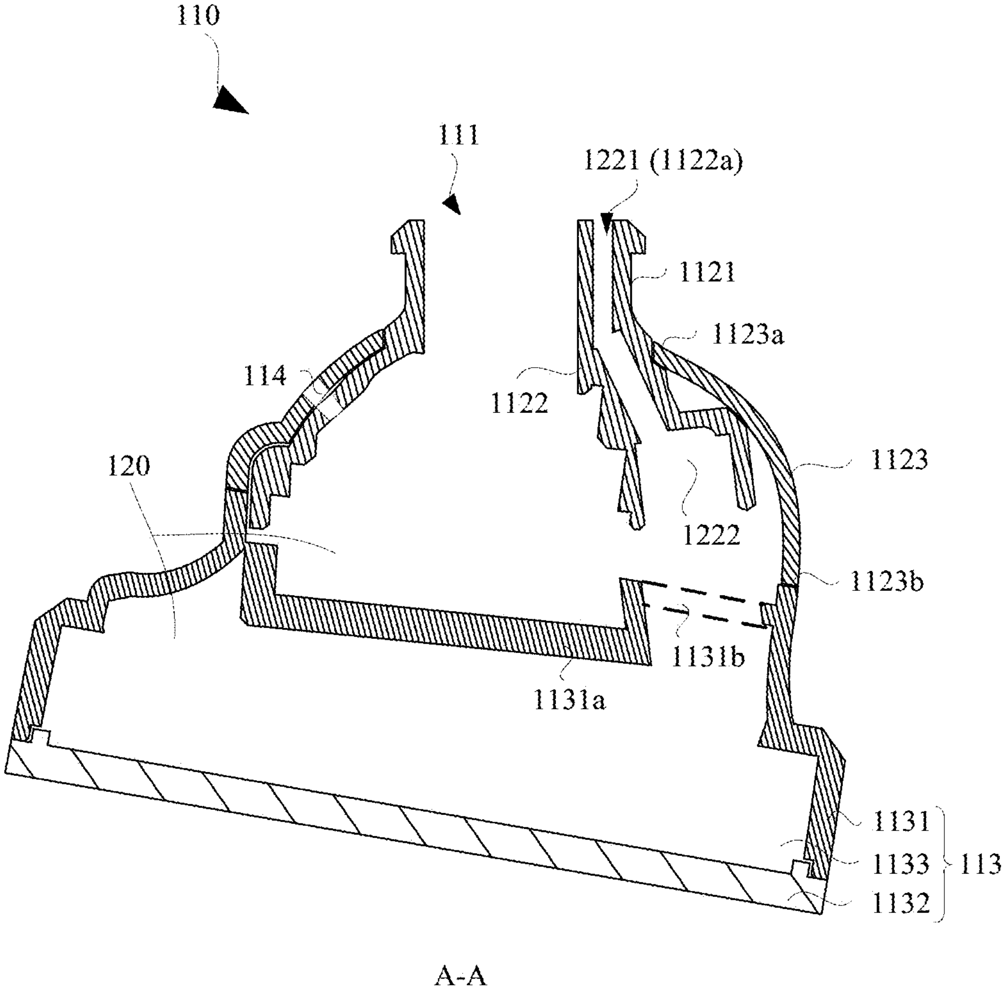
FIG. 4A is a schematic diagram of a part of a housing in a cross-sectional view in an A-A direction in FIG. 2.
Figure 4B:
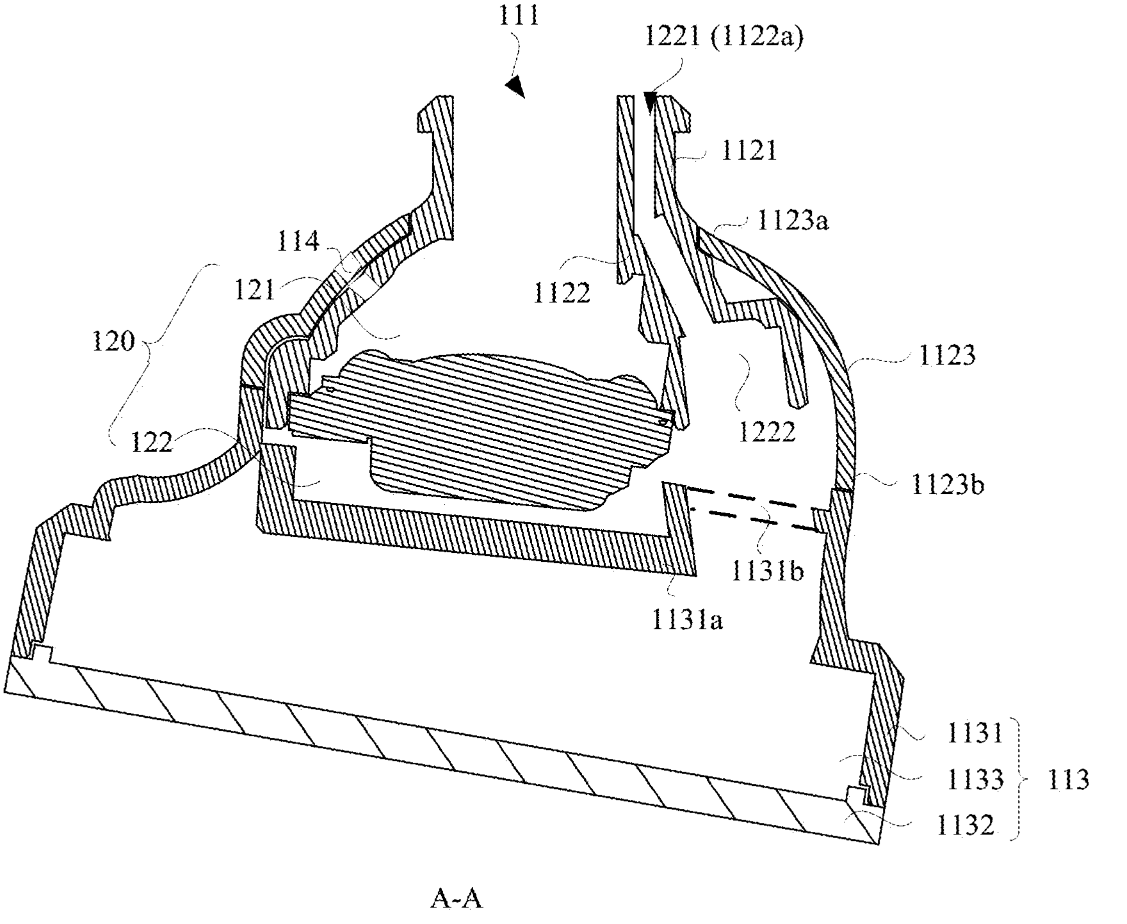
FIG. 4B is a schematic diagram of a part of a housing and a first sound production unit in a cross-sectional view in an A-A direction in FIG. 2.
Figure 4C:
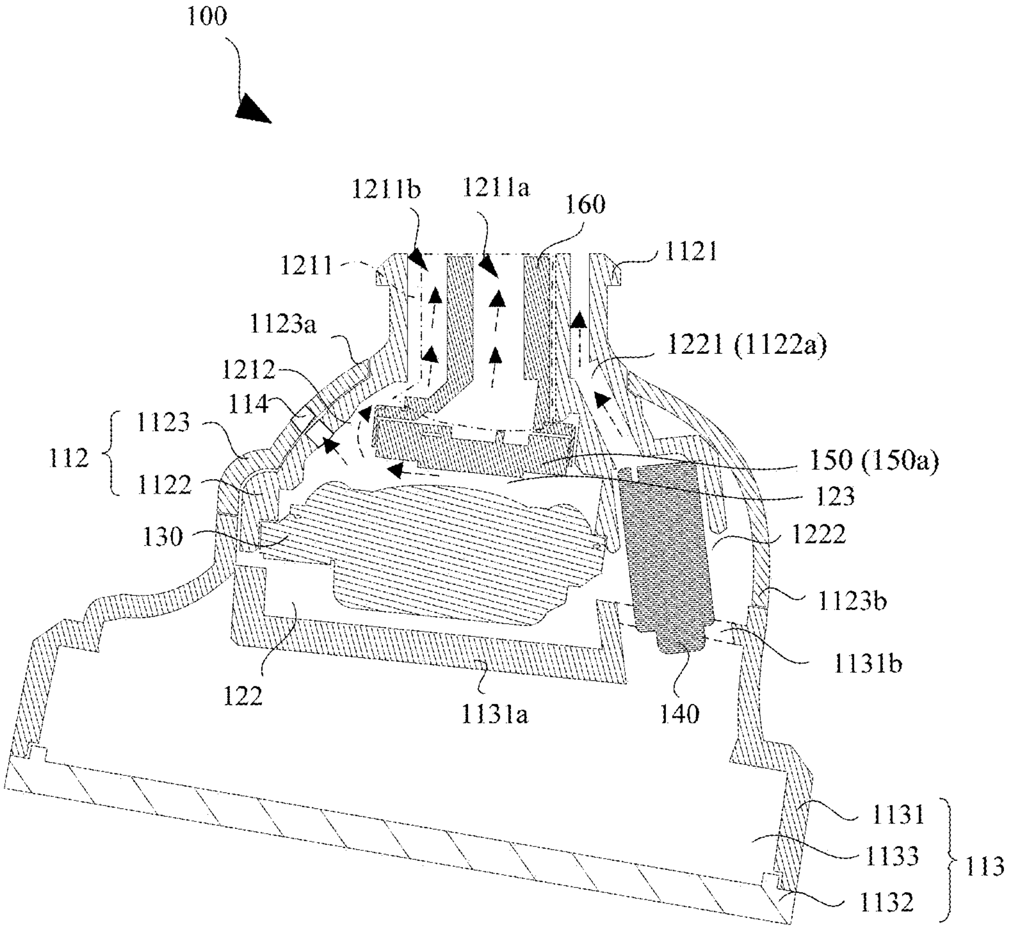
FIG. 4C is a cross-sectional view along A-A in FIG. 2.

FIG. 4A is a schematic diagram of a part of a housing in a cross-sectional view in an A-A direction in FIG. 2. FIG. 4B is a schematic diagram of a part of a housing and a first sound production unit in a cross-sectional view in an A-A direction in FIG. 2. FIG. 4C is a cross-sectional view along A-A in FIG. 2. As shown in FIG. 4A, there is a cavity structure 120 in the housing 110. The cavity structure 120 may be a cavity structure 120 enclosed between an inner wall of the front housing assembly 112 and an inner wall of the rear housing assembly 113. The cavity structure 120 communicates with the sound output port 111. The front housing assembly 112 may include an inner housing 1122 and an outer housing 1123. As shown in FIG. 4C, the inner housing 1122 may be configured to accommodate the first sound production unit 130, the second sound production unit 140, and the micro-electro-mechanical system unit 150 (namely, the third sound production unit 150*a*). The outer housing 1123 is configured to wrap the inner housing 1122, so that the appearance of the earphone 100 may be more beautiful. In addition, the outer housing 1123, the inner housing 1122 and the rear housing assembly 113 may further jointly enclose the cavity structure 120.

Refer to FIG. 4A again. The cavity structure 120 may be a cavity structure 120 enclosed between an inner wall of the inner housing 1122, a part of an inner wall of the outer housing 1123, and the inner wall of the rear housing assembly 113. A first end 1123*a* of the outer housing 1123 is provided with a first through hole (not shown) connected to the inner housing 1122. A second end 1123*b* of the outer housing 1123 is provided with a second through hole (not shown) connected to the rear housing assembly 113. The outer housing 1123 is sleeved on the inner housing 1122. One end that is of the inner housing 1122 and that is away from the rear housing assembly 113 protrudes outward from the first through hole of the outer housing 1123 to form the sound output nozzle 1121. The second through hole of the outer housing 1123 is connected to the rear housing assembly 113. One end that is of the inner housing 1122 and that faces away from the sound output nozzle 1121 may be connected to the first sound production unit 130 (refer to FIG. 4B).

It should be noted that the outer housing 1123 and the inner housing 1122 may be connected through an interference fit, that is, the inner housing 1122 is disposed to penetrate through the first through hole of the outer housing 1123, and an outer wall of the inner housing 1122 is connected to an inner wall of the first through hole through an interference fit, so that the outer housing 1123 is fastened to the inner housing 1122. The outer housing 1123 may alternatively be fastened to the inner housing 1122 in a bonding manner. The outer housing 1123 may be fastened in a clamping manner, or may be fastened in a manner such as bonding, to the rear housing assembly 113. Therefore, a manner of connecting the outer housing 1123 and the inner housing 1122 and a manner of connecting the outer housing 1123 and the rear housing assembly 113 do not constitute a limitation on the protection scope of the technical solutions of this application, provided that the outer housing 1123 is fastened to the inner housing 1122 and the outer housing 1123 is fastened to the rear housing assembly 113.

As shown in FIG. 4B, the first sound production unit 130 is disposed at one end that is of the cavity structure 120 and that is close to the rear housing assembly 113. A surface that is of the first sound production unit 130 and that faces the sound output port 111 and a part of the inner wall of the inner housing 1122 of the front housing assembly 112 form a front cavity 121.

With reference to FIG. 3 and FIG. 4B, a surface that is of the first sound production unit 130 and that faces away from the sound output port 111, a part of the inner wall of the rear housing assembly 113 (namely, the baffle plate 1131*a* of the base 1131), and a part of the inner wall of the outer housing 1123 form a rear cavity 122 separated from the front cavity 121. Because the through hole 1131*b* is provided on the baffle plate 1131*a* of the base 1131, the rear cavity 122 communicates with the hollow structure 1133 of components of the rear cover 1132. The rear cavity 122 may provide space for vibration of the first sound production unit 130. An interior of the hollow structure 1133 may be used to dispose another component of the earphone 100.

As shown in FIG. 4C, a part of the inner wall of the inner housing 1122, a surface that is of the micro-electro-mechanical system unit 150 (namely, the third sound production unit 150*a*) and that faces away from the sound output port 111, and the surface that is of the first sound production unit 130 and that faces the sound output port 111 jointly enclose a middle cavity 123. The middle cavity 123 may be used to provide space for vibration of the first sound production unit 130 and the third sound production unit 150*a*, and may also be used to transmit an acoustic wave signal transmitted by the first sound production unit 130.

It should be noted that the first sound production unit 130 has a low frequency and a large vibration amplitude. The third sound production unit 150*a* has a high frequency and a small vibration amplitude.

Figure 4D:
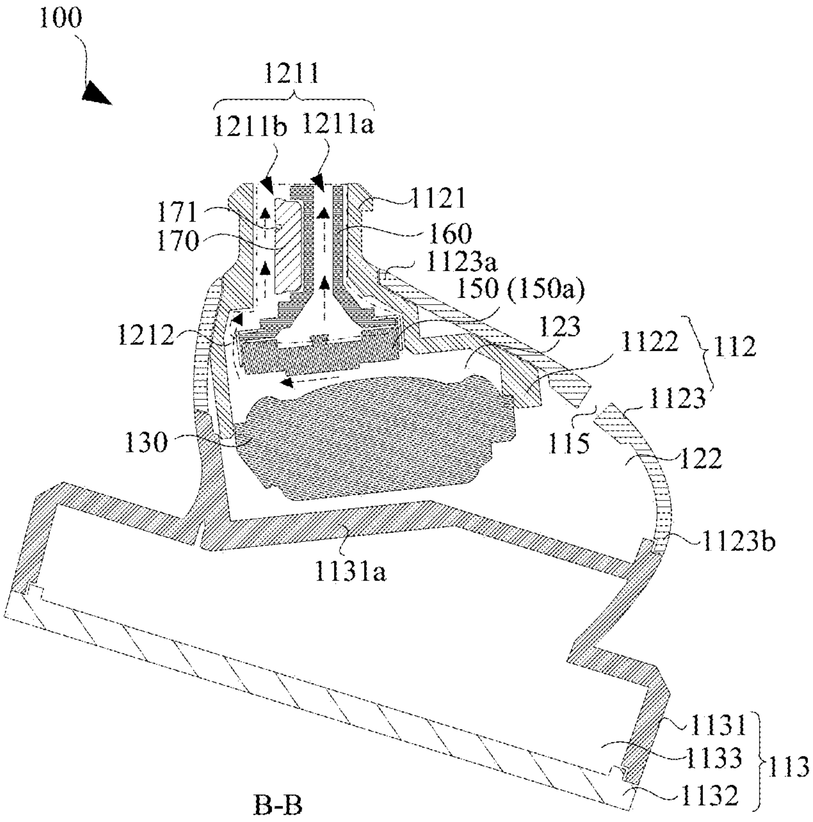
FIG. 4D is a cross-sectional view along B-B in FIG. 2.

FIG. 4D is a cross-sectional view in a B-B direction in FIG. 2. With reference to FIG. 4C and FIG. 4D, the first sound production unit 130, the second sound production unit 140, the micro-electro-mechanical system unit 150 (namely, the third sound production unit 150*a*), the feedback microphone 170, and the pipe support 160 are all assembled in the cavity structure 120. The micro-electro-mechanical system unit 150 (namely, the third sound production unit 150*a*) is disposed between the first sound production unit 130 and the sound output port 111.

The micro-electro-mechanical system unit 150 (namely, the third sound production unit 150*a*) is disposed in the front cavity 121. A surface that is of the micro-electro-mechanical system unit 150 (namely, the third sound production unit 150*a*) and that faces the sound output port 111 and a part of the inner wall of the inner housing 1122 of the front housing assembly 112 enclose a first sound output channel 1211 communicating with the sound output port 111. The first sound output channel 1211 is located between the sound output port 111 and the micro-electro-mechanical system unit 150 (namely, the third sound production unit 150*a*). In addition, the first sound output channel 1211 communicates with the middle cavity 123. A channel 1122*a* is provided on one side of the inner housing 1122. The channel 1122*a* is used as a sound output channel of the second sound production unit 140, namely, a second sound output channel 1221. One end of the second sound output channel 1221 communicates with the sound output port 111. The second sound output channel 1221 and the first sound output channel 1211 are separated and provided independently of each other. There is first accommodation space 1222 that is in the cavity structure 120 and that is capable of accommodating the second sound production unit 140. The first accommodation space 1222 communicates with both the rear cavity 122 and the other end of the second sound output channel 1221. A sound output surface of the second sound production unit 140 faces the second sound output channel 1221. There is a third sound output channel 1212 between a part of an inner wall of the front cavity 121 (namely, a part of the inner wall of the inner housing 1122) and an outer edge of one end of the micro-electro-mechanical system unit 150 (namely, the third sound production unit 150*a*). The middle cavity 123 communicates with the first sound output channel 1211 through the third sound output channel 1212.

It should be noted that the second sound output channel 1221 is provided on but is not limited to one side of the inner housing 1122. It may be understood that if a housing 110 is of an integrated structure, an inner wall of the housing 110 may enclose a front cavity 121, and a second sound output channel 1221 is provided between a part of an inner wall of the front cavity 121 and a part of an outer wall of the housing 110.

As shown in FIG. 4C and FIG. 4D, the first sound output channel 1211 may include a high-frequency sound output channel 1211*a* and a low-frequency sound output channel 1211*b*. The high-frequency sound output channel 1211*a* and the low-frequency sound output channel 1211*b* may be separated and provided independently of each other. The middle cavity 123, the third sound output channel 1212, and the low-frequency sound output channel 1211*b* are all connected.

During use, the acoustic wave signal emitted by the first sound production unit 130 enters the third sound output channel 1212 through the middle cavity 123, and then is transmitted out of the sound output port 111 of the earphone 100 through the low-frequency sound output channel 1211*b* to enter an ear of a user. An acoustic wave signal emitted by the micro-electro-mechanical system unit 150 (namely, the third sound production unit 150*a*) directly enters the ear of the user through the high-frequency sound output channel 1211*a*. An acoustic wave signal emitted by the second sound production unit 140 directly enters the ear of the user through the second sound output channel 1221 (namely, a medium sound output channel). That is, the first sound production unit 130, the second sound production unit 140, and the micro-electro-mechanical system unit 150 (namely, the third sound production unit 150*a*) respectively transmit the acoustic wave signals to the ear of the user through an independent sound output channel, to avoid interference between acoustic wave signals of different frequency bands, thereby improving sound quality.

In addition, with reference to FIG. 1, FIG. 4A, and FIG. 4D, a front vent hole 114 and a rear vent hole 115 are provided on the housing 110 of the earphone 100 in this embodiment of this application. Specifically, the front vent hole 114 is provided on the front housing assembly 112, and the front vent hole 114 communicates with the front cavity 121, so that a front vent channel is formed between the front vent hole 114 and the front cavity 121. In this embodiment, the front vent channel communicates with both the low-frequency sound output channel 1211*b* and the middle cavity 123. The rear vent hole 115 is further provided on the front housing assembly 112, and the rear vent hole 115 communicates with the rear cavity 122, so that a rear vent channel is formed between the rear vent hole 115 and the rear cavity 122. In this embodiment, the rear vent channel communicates with the first accommodation space 1222.

It should be noted that, because the first sound production unit 130 is disposed in the front cavity 122, and the sound production frequency of the first sound production unit 130 is low, the vibration amplitude is large. When the first sound production unit 130 works, the vibration of the first sound production unit 130 pushes air in the front cavity 121 to vibrate, so that air pressure in the front cavity 121 increases. In this way, when the user wears the earphone 100 on the ear, an ear canal communicates with the front cavity 121, gas in the front cavity 121 may enter the ear canal. Consequently, an increase in the air pressure in the front cavity 121 inevitably causes an increase in air pressure in the ear canal, which causes discomfort in the ear. In severe cases, a tympanic membrane of the ear may be damaged. Similarly, the second sound production unit 140 is disposed in the rear cavity 122, and vibration of the second sound production unit 140 also causes an increase in air pressure in the rear cavity 122. Consequently, the air pressure in the ear canal also increases, which causes discomfort in the ear. In severe cases, the tympanic membrane of the ear may be damaged.

Therefore, the front vent hole 114 and the rear vent hole 115 need to be provided to perform air exhaust processing on the first sound production unit 130 and the second sound production unit 140. In addition, because the middle cavity 123 is provided on a side that is of the third sound production unit 150*a* and that is close to the first sound production unit 130, and the middle cavity 123 communicates with both the front cavity 122 and the front vent hole 114, the third sound production unit 150*a* may share the front vent hole 114 with the first sound production unit 130, and does not need to be provided with a vent hole separately.

According to the earphone 100 provided in this embodiment of this application, the front vent hole 114 is provided, and the front vent hole 114 communicates with the front cavity 121, so that the front cavity 121 can communicate with a surrounding environment (namely, an external environment). In this way, when the earphone 100 in this embodiment of this application is worn, air in the ear canal and the front cavity 121 enters the front vent channel (namely, a channel between the front cavity 121 and the front vent hole 114), and then enters the external environment through the front vent hole 114, so that an air flow in the front cavity 121 is quickly discharged. In this way, pressure in the ear canal is quickly balanced, a problem of uncomfortableness caused in a process of wearing the earphone 100 is avoided, and a problem of damage to an eardrum of the user is further avoided.

According to the earphone 100 provided in this embodiment of this application, the rear vent hole 115 is provided, and the rear vent hole 115 communicates with the rear cavity 122, so that the rear cavity 122 can communicate with the surrounding environment (namely, the external environment). In this way, when the earphone 100 in this embodiment of this application is worn, air in the ear canal and the rear cavity enters the rear vent channel (namely, a channel between the rear cavity 122 and the rear vent hole 115), and then enters the external environment through the rear vent hole 115, so that an air flow in the rear cavity 122 is quickly discharged. In this way, the pressure in the ear canal is quickly balanced, the problem of the uncomfortableness caused in the process of wearing the earphone 100 is avoided, and the problem of the damage to the eardrum of the user is further avoided.

It should be noted that, a pointing direction of an arrow of a dashed line with arrows in FIG. 4C and FIG. 4D indicates a propagation direction of an acoustic wave signal.

In this embodiment, the micro-electro-mechanical system unit 150 (namely, the third sound production unit 150*a*) is disposed at a position close to the sound output port 111, so that a length of the high-frequency sound output channel 1211*a* is short. In this way, acoustic mass between the micro-electro-mechanical system unit 150 (namely, the third sound production unit 150*a*) and the sound output port 111 can be reduced, thereby reducing attenuation of a high-frequency sound in a propagation process.

It should be noted that acoustic mass is an obstacle that a sound overcomes in a sound propagation process. Larger acoustic mass indicates greater attenuation of the sound in the propagation process, and smaller acoustic mass indicates smaller attenuation of the sound in the propagation process.

In this embodiment, as shown in FIG. 4C, the pipe support 160 is disposed in the first sound output channel 1211. One end of the pipe support 160 is connected to the micro-electro-mechanical system unit 150 (namely, the third sound production unit 150*a*) in a sealing manner, and the other end of the pipe support 160 extends in a direction close to the sound output port 111. In this embodiment, the other end of the pipe support 160 is located at the sound output port 111. A pipe inside the pipe support 160 forms the high-frequency sound output channel 1211*a*. A part of an outer wall of the pipe support 160 and a part of an inner wall of the first sound output channel 1211 enclose the low-frequency sound output channel 1211*b*.

In this embodiment of this application, the pipe support 160 is disposed, so that the low-frequency sound output channel 1211*b* and the high-frequency sound output channel 1211*a* can be conveniently separated. In this way, a structure of the inner housing 1122 can be simplified.

It should be noted that, in an embodiment in which the pipe support 160 is disposed, the third sound output channel 1212 is enclosed between a part of the outer wall of the pipe support 160, a part of an outer wall of the micro-electro-mechanical system unit 150 (namely, the third sound production unit 150*a*), and a part of the inner wall of the front cavity 121 (namely, a part of the inner wall of the inner housing 1122). In addition, a shape of the pipe support 160 includes but is not limited to a shape shown in FIG. 4C. The shape of the pipe support 160 may be designed based on a specific shape of the housing 110. The pipe support 160 is mainly configured to: fasten the micro-electro-mechanical system unit 150 (namely, the third sound production unit 150*a*), set the high-frequency sound output channel 1211*a*, and set the high-frequency sound output channel 1211*a* and the low-frequency sound output channel 1211*b*. Therefore, any structure that satisfies a function of the pipe support 160 falls within the protection scope of the technical solutions of this application.

It should be noted that a length of the outer wall of the pipe support 160 does not constitute a limitation on the protection scope of the technical solutions of this application. For example, in some embodiments, one end of the pipe support 160 is connected to the micro-electro-mechanical system unit 150 (namely, the third sound production unit 150*a*) in a sealing manner, and the other end of the pipe support 160 may be located at the sound output port 111. In some other embodiments, one end of the pipe support 160 is connected to the micro-electro-mechanical system unit 150 (namely, the third sound production unit 150*a*) in a sealing manner, and the other end of the pipe support 160 may be located between the sound output port 111 and the micro-electro-mechanical system unit 150 (namely, the third sound production unit 150*a*). In this way, the length of the outer wall of the pipe support 160 may be shortened, and a sound resistance increase caused by a long tube feature may be reduced, thereby reducing attenuation of a sound signal of the micro-electro-mechanical system unit 150 (namely, the third sound production unit 150*a*). It should be noted that the length of the outer wall of the pipe support 160 may be specifically set based on a specific requirement.

Refer to FIG. 4D. The earphone 100 in this embodiment further includes the feedback microphone 170. The feedback microphone 170 is disposed in the first sound output channel 1211 and is close to the sound output port 111. A positioning part (not shown) is disposed on the outer wall of the pipe support 160. The feedback microphone 170 is fastened on the positioning part. The positioning part may be a groove or may be a fastener. In addition, a sound pickup port 171 of the feedback microphone 170 communicates with the low-frequency sound output channel 1211*b*.

In this embodiment of this application, the feedback microphone 170 is disposed, so that the earphone 100 can have a noise reduction function. In addition, the feedback microphone 170 is disposed at a position close to the sound output port 111, so that the feedback microphone 170 can conveniently pick up noise, thereby maximizing noise reduction performance of the feedback microphone 170.

It should be noted that a position of the positioning part does not constitute a limitation on the protection scope of the technical solutions of this application. The positioning part may be disposed on the outer wall of the pipe support 160, or may be disposed on an inner housing located on the first sound output channel 1211. The feedback microphone 170 is fastened in the first sound output channel 1211 by using the positioning part, and the feedback microphone 170 faces the first sound output channel 1211, to ensure that the feedback microphone 170 picks up noise.

In this embodiment, the first sound production unit 130, the second sound production unit 140, and the micro-electro-mechanical system unit 150 (namely, the third sound production unit 150*a*) are disposed in the cavity structure 120 of the earphone 100, and the low-frequency sound output channel 1211*b*, the medium-frequency sound output channel, and the high-frequency sound output channel 1211*a* are separated and provided independently of each other, that is, the first sound production unit 130 is separately corresponding to the low-frequency sound output channel 1211*b*, the second sound production unit 140 is separately corresponding to the second sound production unit 140, and the micro-electro-mechanical system unit 150 (namely, the third sound production unit 150*a*) is separately corresponding to the high-frequency sound output channel 1211*a*. In this way, mutual interference between sound signals of three frequencies can be avoided in propagation processes, thereby improving sound effect of the earphone 100.

In addition, in this embodiment, the second sound production unit 140 may be a planar film or a balanced armature unit, the first sound production unit 130 may be a moving coil unit, and the third sound production unit 150*a* is the micro-electro-mechanical system unit 150.

Figure 5:
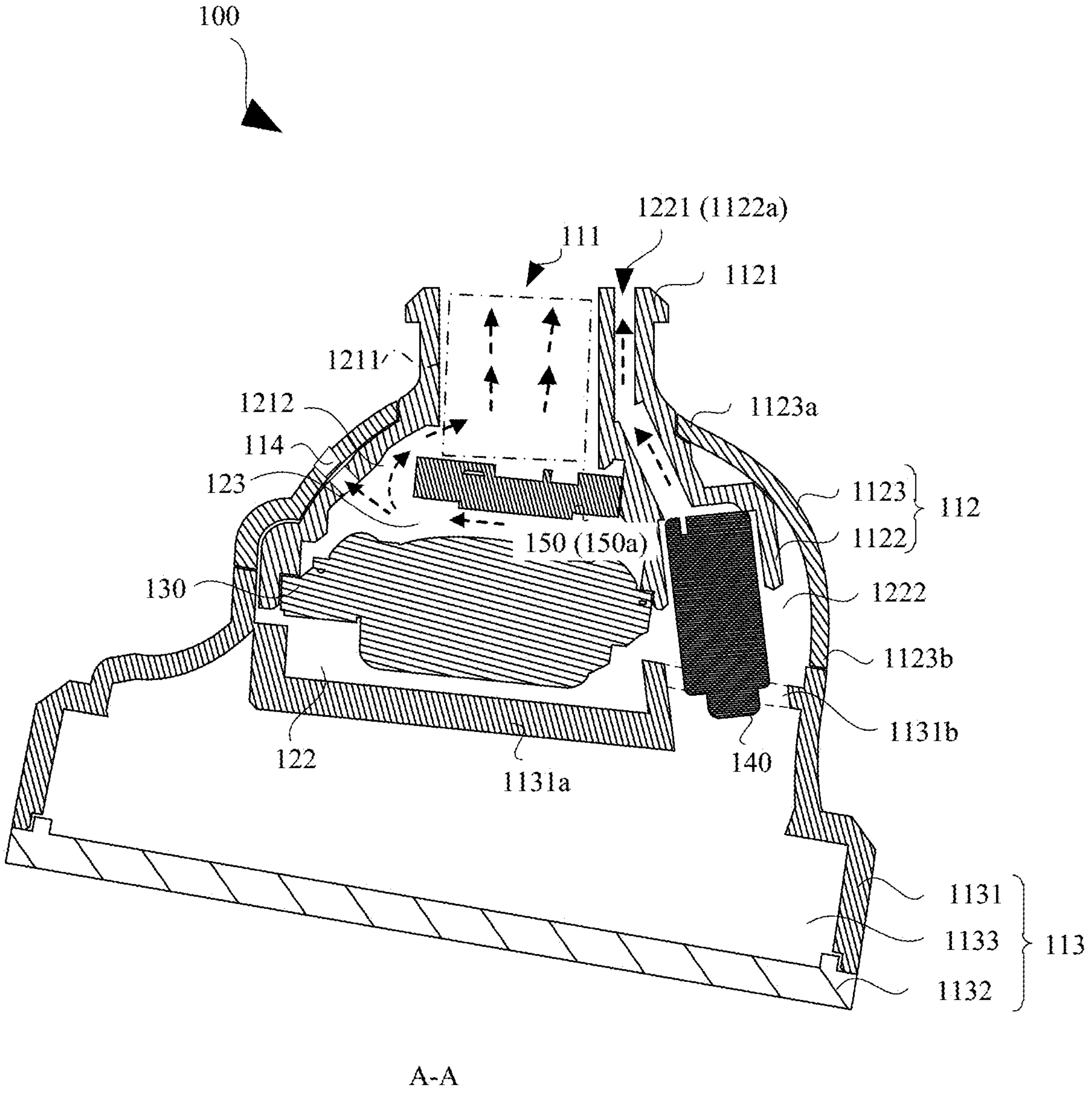
FIG. 5 is another cross-sectional view along A-A in FIG. 2.

It should be noted that, in the foregoing embodiments, the pipe support 160 is disposed, so that the first sound output channel 1211 is divided into the high-frequency sound output channel 1211*a* and the low-frequency sound output channel 1211*b* by using the pipe support 160. In some embodiments, no pipe support may be disposed. As shown in FIG. 5, a surface that is of a first sound production unit 130 and that faces a sound output port 111 and a part of an inner wall of an inner housing 1122 of a front housing assembly 112 form a front cavity 121. A surface that is of the first sound production unit 130 and that faces away from the sound output port 111 and a part of an inner wall of a rear housing assembly 113 form a rear cavity 122 separated from the front cavity 121. The rear cavity 122 communicates with a hollow structure 1133 of components of a rear cover 1132. A part of the inner wall of the inner housing 1122, a surface that is of a micro-electro-mechanical system unit 150 (namely, a third sound production unit 150*a*) and that faces away from the sound output port 111, and the surface that is of the first sound production unit 130 and that faces the sound output port 111 jointly enclose a middle cavity 123.

The first sound production unit 130 and the micro-electro-mechanical system unit 150 (namely, the third sound production unit 150*a*) are both disposed in the front cavity 121. The micro-electro-mechanical system unit 150 (namely, the third sound production unit 150*a*) is disposed between the first sound production unit 130 and the sound output port 111. A surface that is of the micro-electro-mechanical system unit 150 (namely, the third sound production unit 150*a*) and that faces the sound output port 111 and a part of the inner wall of the inner housing 1122 of the front housing assembly 112 enclose a first sound output channel 1211 communicating with the sound output port 111. The first sound output channel 1211 is located between the sound output port 111 and the micro-electro-mechanical system unit 150 (namely, the third sound production unit 150*a*). In addition, the first sound output channel 1211 communicates with the middle cavity 123. The first sound output channel 1211 may include a high-frequency sound output channel 1211*a* and a low-frequency sound output channel 1211*b*. The high-frequency sound output channel 1211*a* and the low-frequency sound output channel 1211*b* communicate with each other, and converge at the first sound output channel 1211.

There is first accommodation space 1222 that is in a cavity structure 120 and that is capable of accommodating a second sound production unit 140. The first accommodation space 1222 communicates with both the rear cavity 122 and the other end of a second sound output channel 1221. A sound output surface of the second sound production unit 140 faces the second sound output channel 1221. A channel 1122*a* is provided on one side of the inner housing 1122. The channel 1122*a* is used as a sound output channel of the second sound production unit 140, namely, the second sound output channel 1221. One end of the second sound output channel 1221 communicates with the sound output port 111. The second sound output channel 1221 and the first sound output channel 1211 are separated and provided independently of each other.

During use, an acoustic wave signal emitted by the first sound production unit 130 enters a third sound output channel 1212 through the middle cavity 123, and then is transmitted out of the sound output port 111 of an earphone 100 through the first sound output channel 1211 to enter an ear of a user. An acoustic wave signal emitted by the micro-electro-mechanical system unit 150 (namely, the third sound production unit 150*a*) directly enters the ear of the user through the first sound output channel 1211. An acoustic wave signal emitted by the second sound production unit 140 directly enters the ear of the user through the second sound output channel 1221.

In this embodiment, the second sound output channel 1221 and the first sound output channel 1211 are separated and provided independently of each other, so that sequential interference between the second sound production unit and the third sound production unit 150*a* can be reduced. The micro-electro-mechanical system unit 150 (namely, the third sound production unit 150*a*) is disposed at a position close to the sound output port 111, so that a length of the high-frequency sound output channel 1211*a* is short. In this way, acoustic mass between the micro-electro-mechanical system unit 150 (namely, the third sound production unit 150*a*) and the sound output port 111 can be reduced, thereby reducing attenuation of a high-frequency sound in a propagation process.

It should be noted that, in this embodiment, a feedback microphone is also included. The feedback microphone may be disposed on the inner housing and disposed close to the sound output port. A sound pickup port of the feedback microphone faces the first sound output channel. In this way, the feedback microphone can conveniently pick up a sound inside the earphone.

The micro-electro-mechanical system unit 150 may convert an electrical signal into an acoustic wave signal, and therefore may be used as a sound production apparatus. In addition, the micro-electro-mechanical system unit 150 uses inverse piezoelectric effect to apply a voltage to a piezoelectric crystal, so that the piezoelectric crystal generates corresponding mechanical deformation, and a diaphragm of the micro-electro-mechanical system unit 150 is driven to vibrate to generate an acoustic wave. The piezoelectric crystal of the micro-electro-mechanical system unit 150 has a very good transient vibration characteristic and a high vibration frequency. Therefore, compared with a conventional moving coil unit or a conventional balanced armature unit, the micro-electro-mechanical system unit 150 has better high-frequency performance. Therefore, in this embodiment of this application, the micro-electro-mechanical system unit 150 used as the third sound production unit is used in cooperation with a moving coil unit used as the first sound production unit 130, so that sound quality of the earphone 100 in medium and high frequency bands can be greatly improved.

An acoustic wave transmitted by the first sound production unit 130 has a low frequency and a long wavelength, and requires a large amplitude and an effective vibration area to push air. A diaphragm of the moving coil unit has good elasticity, and a design of a large amplitude of the diaphragm of the moving coil unit can ensure good low-frequency performance. Therefore, the first sound production unit 130 is designed as the moving coil unit, so that low-frequency sound quality of the earphone 100 can be improved.

A planar film or a balanced armature unit, and a micro-electro-mechanical system are limited by a design principle of a component body. Consequently, a large amplitude scheme cannot be implemented. The planar film or the balanced armature unit may alternatively be used as the third sound production unit 115*a*. However, the micro-electro-mechanical system unit 150 has better transient performance than the planar film and the balanced armature unit. Therefore, the planar film or the balanced armature unit is designed as the second sound production unit 140.

Figure 6:
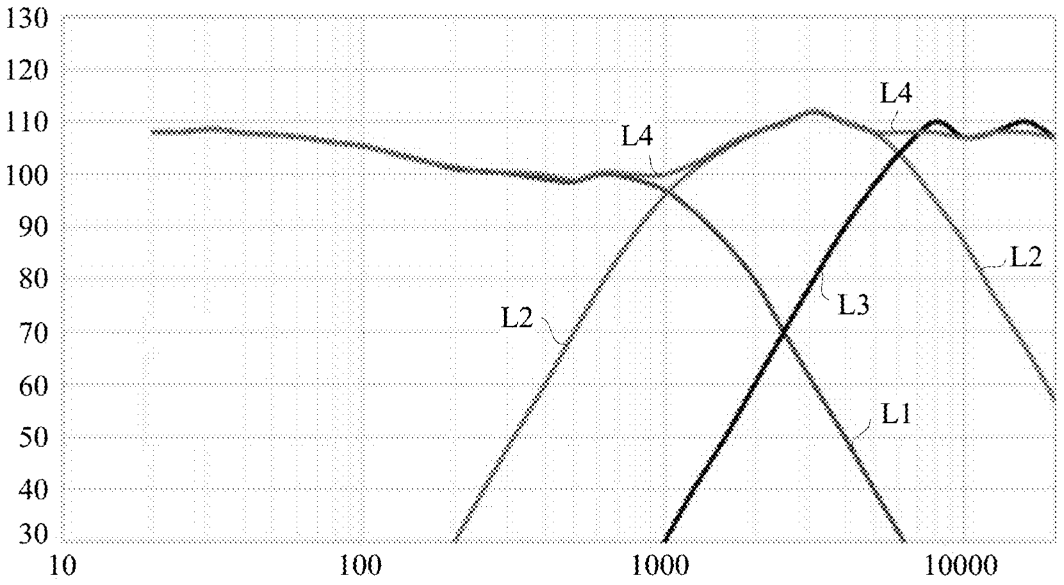
FIG. 6 is a schematic diagram of separate frequency response curves of three sound production units of an earphone and an overall frequency response curve of the three sound production units according to an embodiment of this application.

As shown in FIG. 6, frequency response curves of the first sound production unit 130, the second sound production unit 140, and the third sound production unit 150*a* (namely, the micro-electro-mechanical system unit 150) are separately tested. A curve of the first sound production unit 130 is L1, a curve of the second sound production unit 140 is L2, a curve of the third sound production unit 150*a* is L3, and an overall curve of the three sound production units is L4.

As an explanation, in this embodiment, a low frequency band may be a part of a frequency band whose frequency is less than 1 kHz, a medium frequency band may be a part of a frequency band whose frequency ranges between 1 kHz and 6 kHz, and a high frequency band may be a part of a frequency band whose frequency is greater than 6 kHz. The foregoing frequency relationship may also be represented as: the low frequency band<the medium frequency band<the high frequency band. A frequency band corresponding to the first sound production unit 130 is the low frequency band, a frequency band corresponding to the second sound production unit 140 is the medium frequency band, and a frequency band corresponding to the third sound production unit 150*a* is the high frequency band. Therefore, a relationship among sound production frequencies corresponding to the first sound production unit 130, the second sound production unit 140, and the third sound production unit 150*a* may be represented as: the first sound production unit 130<the second sound production unit 140<the third sound production unit 150*a*.

In some embodiments, for example, the sound production frequency of the first sound production unit 130 may range from 30 Hz to 1000 Hz, and the sound production frequency of the first sound production unit 130 may be specifically an appropriate value such as 30 Hz, 50 Hz, 100 Hz, 200 Hz, 300 Hz, 500 Hz or 800 Hz. The sound production frequency of the second sound production unit 140 may range between 1 kHz and 6 kHz, and the sound production frequency of the second sound production unit 140 may be specifically an appropriate value such as 1500 Hz, 2000 Hz, 2500 Hz, 3000 Hz, 3500 Hz, 4000 Hz or 5000 Hz. The sound production frequency of the third sound production unit 150*a* may range from 6 kHz to 20 kHz, and the sound production frequency of the third sound production unit 150*a* may be specifically an appropriate value such as 6000 Hz, 6500 Hz, 7000 Hz, 8000 Hz, 9000 Hz, 10000 Hz or 15000 Hz. It may be understood that each of the first sound production unit 130, the second sound production unit 140, and the third sound production unit 150*a* is corresponding to a frequency band, and each of the first sound production unit 130, the second sound production unit 140, and the third sound production unit 150*a* may emit a sound of any frequency within the frequency range. Therefore, in this embodiment of this application, specific occurrence frequencies of the first sound production unit 130, the second sound production unit 140, and the third sound production unit 150*a* are not listed one by one. As shown in FIG. 6, a waveform of L1 is stable and frequency response is good in the low frequency band. When the medium frequency band is entered, there is a significant decline in the curve L1 and the frequency response is poor. Frequency response of L2 in the low frequency band is poor. As a frequency increases, L2 gradually rises, and the frequency response is gradually improved. After the medium frequency band is entered, the frequency response gradually achieves better effect. After the high frequency band is entered, the curve L2 gradually falls, and the frequency response gradually deteriorates. In the medium frequency band, as a frequency increases, the curve L3 gradually rises, and frequency response is gradually improved. After the high frequency band is entered, L3 is in a stable toggle state. L4 is stable in a waveform region of a frequency response curve throughout the low frequency band to the high frequency band, and frequency response is good.

In conclusion, when the three sound production units are separately applied or two of the three sound production units are applied together, there is a case in which response in a frequency band is poor. For example, if a low frequency and a high frequency cooperate, frequency response is poor in the medium frequency band, or if a low frequency and a medium frequency cooperate, frequency response is poor in the high frequency band. However, the first sound production unit 130, the second sound production unit 140, and the third sound production unit 150*a* (namely, the micro-electro-mechanical system unit 150) are disposed in the earphone 100 provided in this embodiment. Therefore, the earphone 100 in this embodiment of this application has good frequency response in an entire frequency band, thereby effectively improving sound quality of the earphone 100. It can be learned from the foregoing curves that, in the earphone 100 in this embodiment of this application, the first sound production unit 130, the second sound production unit 140, and the micro-electro-mechanical system unit 150 (namely, the third sound production unit 150*a*) are disposed, and the low-frequency sound output channel 1211*b*, the medium-frequency sound output channel, and the high-frequency sound output channel 1211*a* are separated and provided independently of each other. This can ensure full-frequency-band coverage effect of the earphone 100 and better sound effect.

In addition, it should be noted that, in this embodiment of this application, the earphone 100 may further include a soft earplug 232 (not shown in the figure). The earplug 232 is disposed on an outer side of the sound output nozzle 1121. When the earphone 100 is worn, the earplug 232 may be plugged into the ear of the user, so that the earphone 100 is worn on the ear of the user.

In addition, in this embodiment, the high-frequency sound output channel 1211*a* is provided in the pipe support 160.

Figure 9:
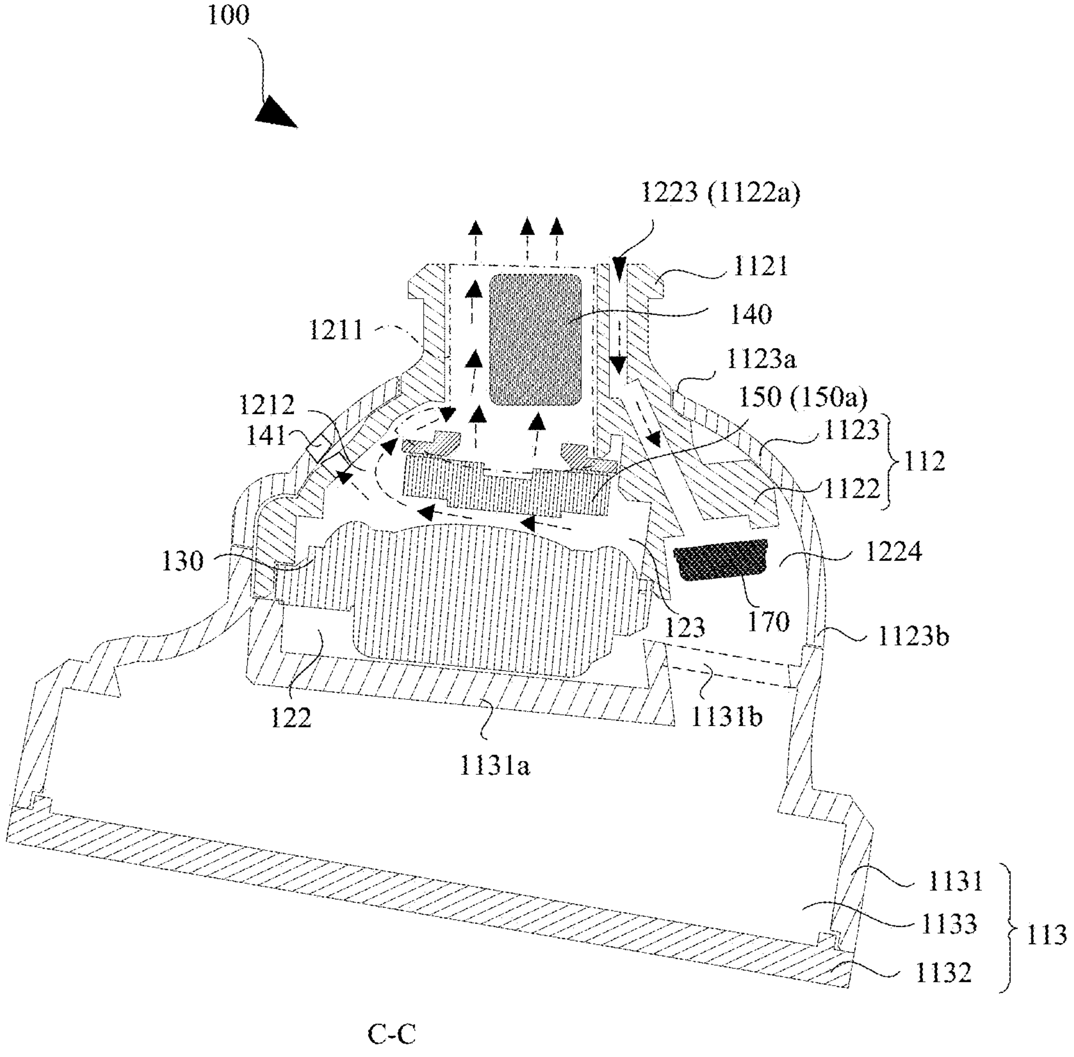
FIG. 9 is a cross-sectional view along C-C in FIG. 7.

The pipe support 160 is disposed, so that the high-frequency sound output channel 1211*a* and the low-frequency sound output channel 1211*b* are separated. It should be noted that, in some embodiments, no pipe support 160 may be disposed. As shown in FIG. 9, a micro-electro-mechanical system unit 150 (namely, a third sound production unit 150*a*) may be directly fastened to a side wall of an inner housing 1122, and the micro-electro-mechanical system unit 150 (namely, the third sound production unit 150*a*) is disposed close to a sound output port 111. A high-frequency sound output channel 1211*a* and a low-frequency sound output channel 1211*b* converge at a first sound output channel 1211.

Figure 7:
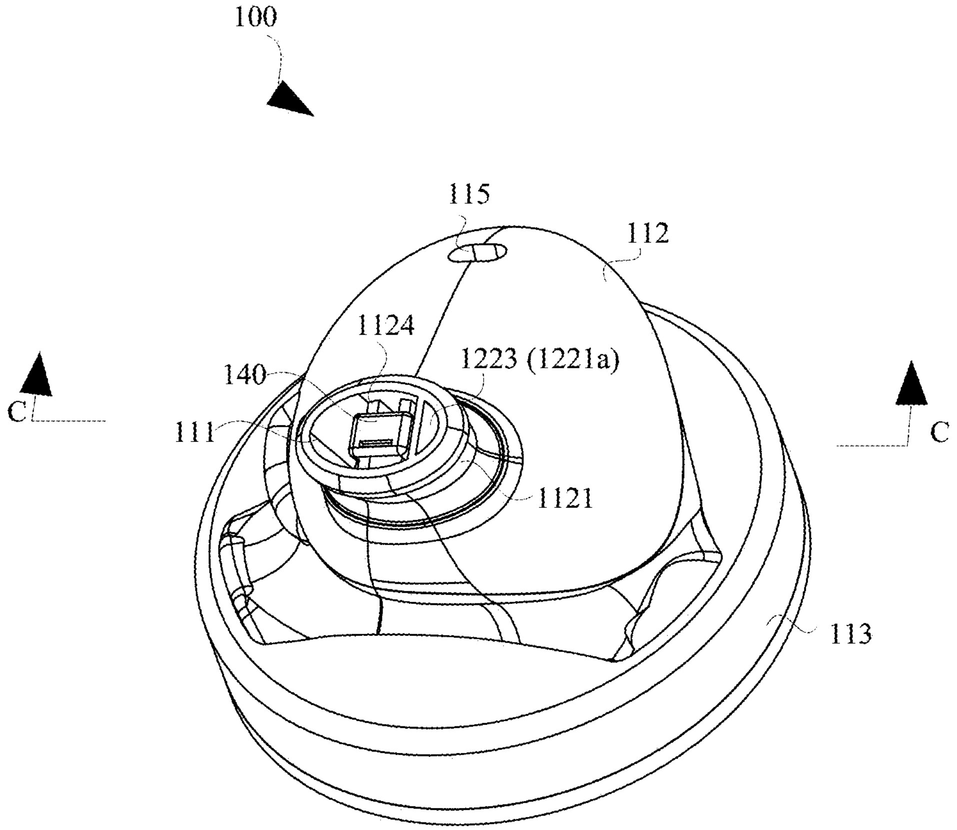
FIG. 7 is a schematic diagram of a structure of another earphone according to an embodiment of this application.
Figure 8:
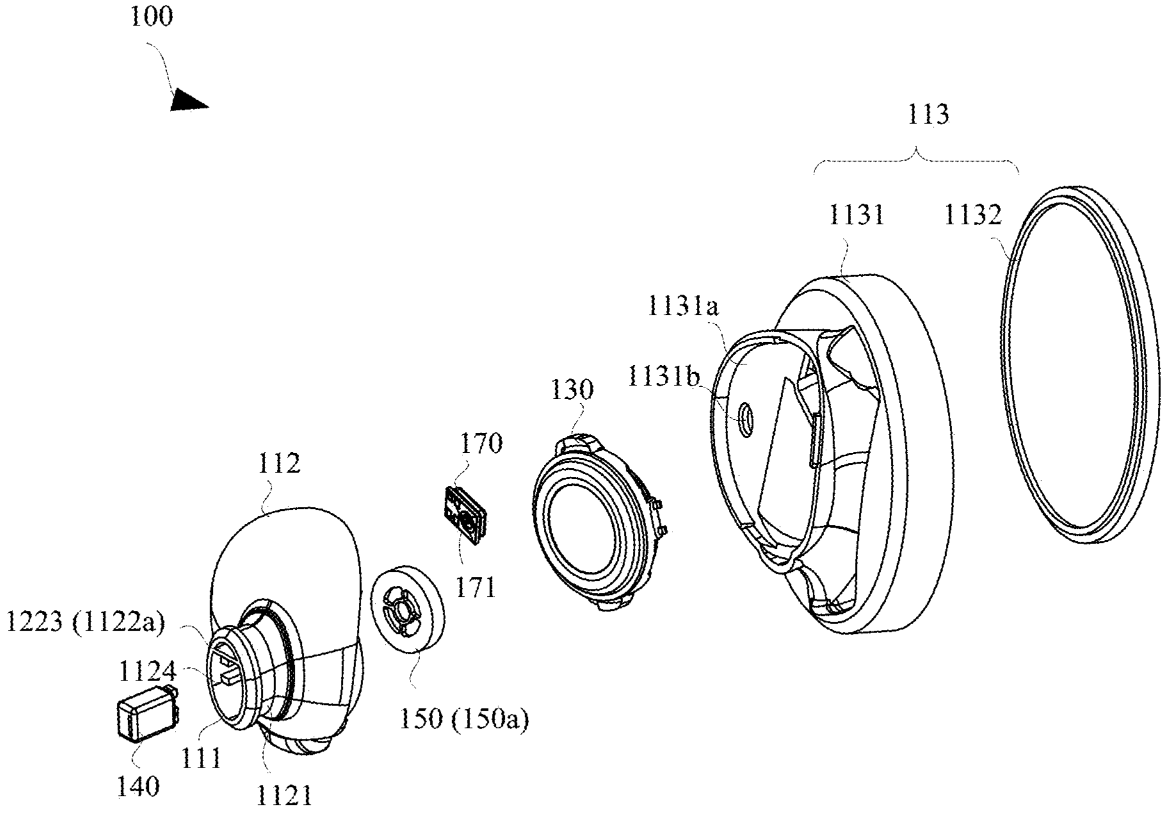
FIG. 8 is an exploded view of FIG. 7.

FIG. 7 is a schematic diagram of a structure of another earphone according to an embodiment of this application. FIG. 8 is an exploded view of FIG. 7. As shown in FIG. 7 and FIG. 8, this embodiment provides an earphone 100, including a housing 110. The housing 110 includes a front housing assembly 112 and a rear housing assembly 113. The front housing assembly 112 is connected to the rear housing assembly 113. One end of the front housing assembly 112 has a sound output nozzle 1121 protruding outward, and one end of the sound output nozzle 1121 defines a sound output port 111. In addition, a first sound production unit 130, a third sound production unit 150*a*, and a feedback microphone 170 are disposed between the front housing 110 assembly and the rear housing 110 assembly. A second sound production unit 140 is disposed in the sound output nozzle 1121. The third sound production unit 150*a* is a micro-electro-mechanical system unit 150.

It should be noted that one end that is of the sound output nozzle 1121 and that is away from the rear housing assembly 113 is the sound output port 111.

The rear housing assembly 113 includes a base 1131 and a rear cover 1132. The base 1131 is disposed close to the front housing assembly 112. A baffle plate 1131*a* is disposed at one end that is of the base 1131 and that is close to the front housing assembly 112. A through hole 1131*b* is provided on the baffle plate 1131*a*. Two sides of the baffle plate 1131*a* are communicated through the through hole 1131*b*. The rear cover 1132 is disposed at one end that is of the base 1131 and that is away from the front housing assembly 112, and is fastened to the base 1131. The end that is of the base 1131 and that is close to the front housing assembly 112 may be fastened to the front housing assembly 112. A hollow structure 1133 is formed between the base 1131 and the rear cover 1132.

It should be noted that a cavity structure 120 in this embodiment is basically the same as the cavity structure 120 in FIG. 4A and FIG. 4B in shape. Therefore, for description of this part of structure, still refer to FIG. 4A and FIG. 4B.

FIG. 9 is a cross-sectional view along C-C in FIG. 7. As shown in FIG. 4A, there is a cavity structure 120 (refer to FIG. 4A) in the housing 110. The cavity structure 120 may be a cavity structure 120 enclosed between an inner wall of the front housing assembly 112 and an inner wall of the rear housing assembly 113. As shown in FIG. 9, the cavity structure 120 communicates with the sound output port 111. The first sound production unit 130, the second sound production unit 140, the micro-electro-mechanical system unit 150 (namely, the third sound production unit 150*a*), and the feedback microphone 170 are all assembled in the cavity structure 120. The micro-electro-mechanical system unit 150 (namely, the third sound production unit 150*a*) is disposed between the first sound production unit 130 and the sound output port 111. The second sound production unit 140 is disposed in the sound output nozzle 1121. The second sound production unit 140 is located between the sound output port 111 and the micro-electro-mechanical system unit 150 (namely, the third sound production unit 150*a*).

Still refer to FIG. 4A. The front housing assembly 112 may include an inner housing 1122 and an outer housing 1123. The cavity structure 120 may be a cavity structure 120 enclosed between an inner wall of the inner housing 1122, a part of an inner wall of the outer housing 1123, and the inner wall of the rear housing assembly 113. A first end 1123*a* of the outer housing is provided with a first through hole connected to the inner housing 1122. A second end 1123*b* of the outer housing is provided with a second through hole connected to the rear housing assembly 113. The outer housing 1123 is sleeved on the inner housing 1122.

Refer to FIG. 9. One end that is of the inner housing 1122 and that is away from the rear housing assembly 113 protrudes outward from the first through hole of the outer housing 1123 to form the sound output nozzle 1121. A pillar 1124 protruding outward is disposed on an inner side of the sound output nozzle 1121. The second sound production unit 140 and the pillar 1124 are in interference fit, so that the second sound production unit 140 is fastened in the sound output nozzle 1121. The second through hole of the outer housing 1123 is connected to the rear housing assembly 113. One end that is of the inner housing 1122 and that faces away from the sound output nozzle 1121 is connected to the first sound production unit 130.

Figure 10:
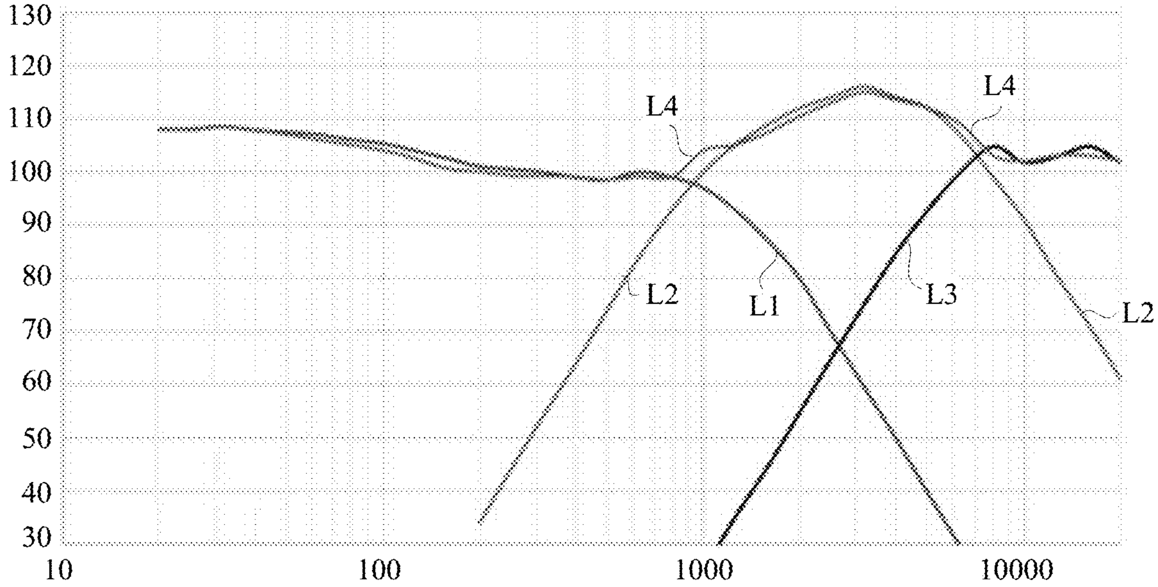
FIG. 10 is a schematic diagram of separate frequency response curves of three sound production units of another earphone and an overall frequency response curve of the three sound production units according to an embodiment of this application.

Refer to FIG. 4B again. A surface that is of the first sound production unit 130 and that faces the sound output port 111 and a part of the inner wall of the inner housing 1122 of the front housing assembly 112 form a front cavity 121. A surface that is of the first sound production unit 130 and that faces away from the sound output port 111, a part of the inner wall of the rear housing assembly 113 (namely, the baffle plate 1131*a* of the base 1131), and a part of the inner wall of the outer housing 1123 form a rear cavity 122 separated from the front cavity 121. Because the through hole 1131*b* is provided on the baffle plate 1131*a* of the base 1131, the rear cavity 122 communicates with the hollow structure 1133 of the rear housing assembly 113. The rear cavity 122 may provide space for vibration of the first sound production unit 130. An interior of the hollow structure 1133 may be used to dispose another component of the earphone. Refer to FIG. 10. A part of the inner wall of the inner housing 1122, a surface that is of the micro-electro-mechanical system unit 150 (namely, the third sound production unit 150*a*) and that faces away from the sound output port 111, and the surface that is of the first sound production unit 130 and that faces the sound output port 111 jointly enclose a middle cavity 123.

A front vent hole 114 and a rear vent hole 115 are provided on the housing 110 of the earphone 100. Specifically, the front vent hole 114 is provided on the front housing assembly 112, and the front vent hole 114 communicates with the front cavity 121, so that a front vent channel is formed between the front vent hole 114 and the front cavity 121. In this embodiment, because a low-frequency sound output channel 1211*b* and the middle cavity 123 are located in the front cavity 121, the front vent channel communicates with both the low-frequency sound output channel 1211*b* and the middle cavity 123. Because the first sound production unit 130, the second sound production unit 140, and the third sound production unit 150*a* are all disposed in the front cavity 122, the three sound production units may share one front vent hole 114. For a specific principle, refer to the descriptions in the foregoing embodiments. Details are not described herein again.

A surface that is of the micro-electro-mechanical system unit 150 (namely, the third sound production unit 150*a*) and that faces the sound output port 111 and a part of the inner wall of the inner housing 1122 of the front housing assembly 112 enclose a first sound output channel 1211 communicating with the sound output port 111. The first sound output channel 1211 is located between the sound output port 111 and the micro-electro-mechanical system unit 150 (namely, the third sound production unit 150*a*). In addition, the first sound output channel 1211 communicates with the middle cavity 123. A channel 1122*a* may be further provided on one side of the inner housing 1122. The channel 1122*a* may be used as a sound pickup channel 1223 of the feedback microphone 170. One end of the sound pickup channel 1223 communicates with the sound output port 111. There is second accommodation space 1224 in the cavity structure 120. The second accommodation space 1224 communicates with the rear cavity 122 and the other end of the sound pickup channel 1223. In addition, the feedback microphone 170 is disposed in the second accommodation space 1224. A sound pickup port 171 of the feedback microphone 170 faces the other end of the sound pickup channel 1223. There is a third sound output channel 1212 between a part of an inner wall of the front cavity 121 (namely, a part of the inner wall of the inner housing 1122) and an outer edge of one end of the micro-electro-mechanical system unit 150 (namely, the third sound production unit 150*a*). The middle cavity 123 communicates with the first sound output channel 1211 through the third sound output channel 1212.

In addition, the rear vent hole 115 is further provided on the front housing assembly 112, and the rear vent hole 115 communicates with the rear cavity 122, so that a rear vent channel is formed between the rear vent hole 115 and the rear cavity 122. In this embodiment, the rear vent channel communicates with both the second accommodation space 1224 and the sound pickup channel 1223. Therefore, the rear vent hole 115 may provide an additional path for residual noise to be transmitted to the feedback microphone 170. This improves coherence of the noise received by the feedback microphone 170, thereby facilitating noise reduction processing by the earphone, and achieving better noise reduction effect. It should be noted that the sound pickup channel 1223 of the feedback microphone 170 is provided on but is not limited to one side of the inner housing 1122, provided that the sound pickup channel 1223 of the feedback microphone 170 is provided between a part of the inner wall of the front cavity 121 and a part of an outer wall of the housing 110.

As shown in FIG. 9, the second sound production unit 140 is disposed in the first sound output channel 1211, and is located between the micro-electro-mechanical system unit 150 (namely, the third sound production unit 150*a*) and the sound output port 111. The first sound output channel 1211 may include a high-frequency sound output channel 1211*a*, a medium-frequency sound output channel, and the low-frequency sound output channel 1211*b*. The medium-frequency sound output channel is located in the high-frequency sound output channel 1211*a*, and is provided close to the sound output port 111. The low-frequency sound output channel 1211*b* is located on one side of the high-frequency sound output channel 1211*a*. The high-frequency sound output channel 1211*a* and the low-frequency sound output channel 1211*b* converge at the first sound output channel 1211.

During use, an acoustic wave signal emitted by the first sound production unit 130 enters the third sound output channel 1212 through the middle cavity 123, and then is transmitted out of the sound output port 111 of the earphone 100 through the low-frequency sound output channel 1211*b* (namely, a part of the first sound output channel 1211) to enter an ear of a user. An acoustic wave signal emitted by the micro-electro-mechanical system unit 150 (namely, the third sound production unit 150*a*) directly enters the ear of the user through the high-frequency sound output channel 1211*a* (namely, a part of the first sound output channel 1211). An acoustic wave signal emitted by the second sound production unit 140 directly enters the ear of the user through the first sound output channel 1211. That is, the first sound production unit 130, the second sound production unit 140, and the micro-electro-mechanical system unit 150 (namely, the third sound production unit 150*a*) all transmit the acoustic wave signals to the ear of the user through the first sound output channel 1211.

It should be noted that, in FIG. 9, a pointing direction of an arrow that is of a dashed line with arrows and that is located in the first sound output channel 1211 indicates a propagation direction of an acoustic wave signal. A pointing direction of an arrow that is of a dashed line with arrows and that is located in the sound pickup channel 1223 is a propagation direction of a sound signal collected by the feedback microphone.

In the foregoing embodiments, the second sound production unit 140 may be a planar film or a balanced armature unit, the first sound production unit 130 may be a moving coil unit, and the third sound production unit 150*a* is the micro-electro-mechanical system unit 150.

It should be noted that medium-frequency and high-frequency sounds are easily lost in propagation processes. Therefore, the second sound production unit 140 and the micro-electro-mechanical system unit 150 (namely, the third sound production unit 150*a*) may be disposed at a position that is close to the sound output port 111. In this way, acoustic mass between the second sound production unit 140 and the sound output port 111 and between the micro-electro-mechanical system unit 150 (namely, the third sound production unit 150*a*) and the sound output port 111 may be reduced, thereby reducing attenuation of the second sound production unit 140 and the high-frequency sound in the propagation processes.

The planar film or the balanced armature unit is in a cuboid shape, the cuboid structure may extend into the sound output nozzle 1121, and the micro-electro-mechanical system unit 150 (namely, the third sound production unit 150*a*) is in a cylindrical shape and cannot extend into the sound output nozzle 1121. Therefore, in this embodiment, the second sound production unit 140 is disposed inside the sound output nozzle 1121, the micro-electro-mechanical system unit 150 (namely, the third sound production unit 150*a*) is disposed below the second sound production unit 140, and the first sound production unit 130 is disposed below the micro-electro-mechanical system unit 150 (namely, the third sound production unit 150*a*). In this way, a distance between the second sound production unit 140 and the sound output port 111 is very small, so that medium frequency effect of the earphone 100 can be optimized, and sound effect can be enhanced. The micro-electro-mechanical system unit 150 (namely, the third sound production unit 150*a*) is also close to the sound output port 111, and front acoustic mass is also small. Therefore, sound effect can also be enhanced.

As shown in FIG. 10, frequency response curves of the first sound production unit 130, the second sound production unit 140, and the third sound production unit (namely, the micro-electro-mechanical system unit 150) are separately tested. A curve of the first sound production unit 130 is L1, a curve of the second sound production unit 140 is L2, a curve of the third sound production unit 150*a* is L3, and an overall curve of the three sound production units is L4.

As shown in FIG. 10, a waveform of L1 is stable and frequency response is good in the low frequency band. When the medium frequency band is entered, there is a significant decline in the curve L1 and the frequency response is poor. Frequency response of L2 in the low frequency band is poor. As a frequency increases, L2 gradually rises, and the frequency response is gradually improved. After the medium frequency band is entered, the frequency response gradually achieves better effect. After the high frequency band is entered, the curve L2 gradually falls, and the frequency response gradually deteriorates. In the medium frequency band, as a frequency increases, the curve L3 gradually rises, and frequency response is gradually improved. After the high frequency band is entered, L3 is in a stable toggle state. L4 is stable in a waveform region of a frequency response curve throughout the low frequency band to the high frequency band, and frequency response is good.

In conclusion, when the three sound production units are separately applied or two of the three sound production units are applied together, there is a case in which response in a frequency band is poor. For example, if a low frequency and a high frequency cooperate, frequency response is poor in the medium frequency band, or if a low frequency and a medium frequency cooperate, frequency response is poor in the high frequency band. However, the first sound production unit 130, the second sound production unit 140, and the third sound production unit 150*a* (namely, the micro-electro-mechanical system unit 150) are disposed in the earphone 100 provided in this embodiment. Therefore, the earphone 100 in this embodiment of this application has good frequency response in an entire frequency band, thereby effectively improving sound quality of the earphone 100.

It should be noted that the earphone 100 in this embodiment of this application includes but is not limited to the foregoing TWS earphone. In some embodiments, the earphone 100 may alternatively be a common wireless Bluetooth earphone, a wired earphone, or the like.

In this embodiment of this application, the first sound production unit 130, the second sound production unit 140, and the micro-electro-mechanical system unit 150 (namely, the third sound production unit 150*a*) are disposed in the earphone 100. This can effectively ensure an output bandwidth of the earphone 100, and implement good full-frequency-band coverage effect and improved sound effect. In addition, the micro-electro-mechanical system unit 150 (namely, the third sound production unit 150*a*) is used as the third sound production unit 150*a*. The micro-electro-mechanical system unit 150 has a good transient vibration characteristic and a high vibration frequency. Therefore, compared with a conventional moving coil unit or a conventional balanced armature unit, the micro-electro-mechanical system unit 150 has better high-frequency performance. This greatly improves sound quality of the earphone 100 in the high frequency band.

It should be noted that an appearance of the earphone 100 in the foregoing embodiments does not constitute a limitation on the protection scope of the technical solutions of this application. All technical solutions in which the first sound production unit 130, the second sound production unit 140, and the third sound production unit 150*a* are disposed inside the earphone 100, and the micro-electro-mechanical system unit 150 is used as the third sound production unit 150*a* fall within the protection scope of the technical solutions of this application.

A second aspect of embodiments of this application provides a terminal device, including the earphone 100 in the foregoing embodiments.

The following uses a smart wristband 200 as the terminal device for description.

Figure 11:
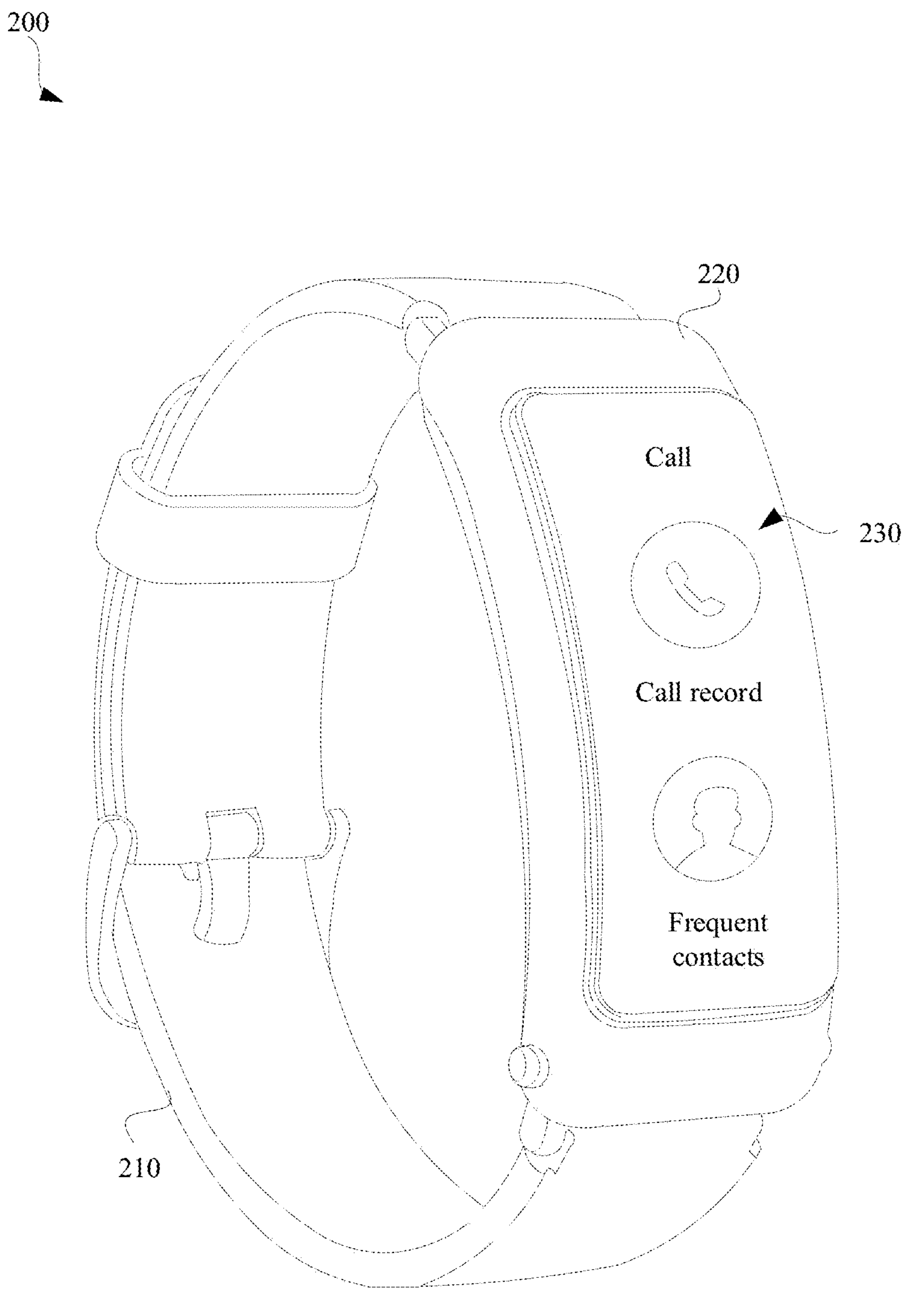
FIG. 11 is a schematic diagram of a structure of a terminal device according to an embodiment of this application.
Figure 12:
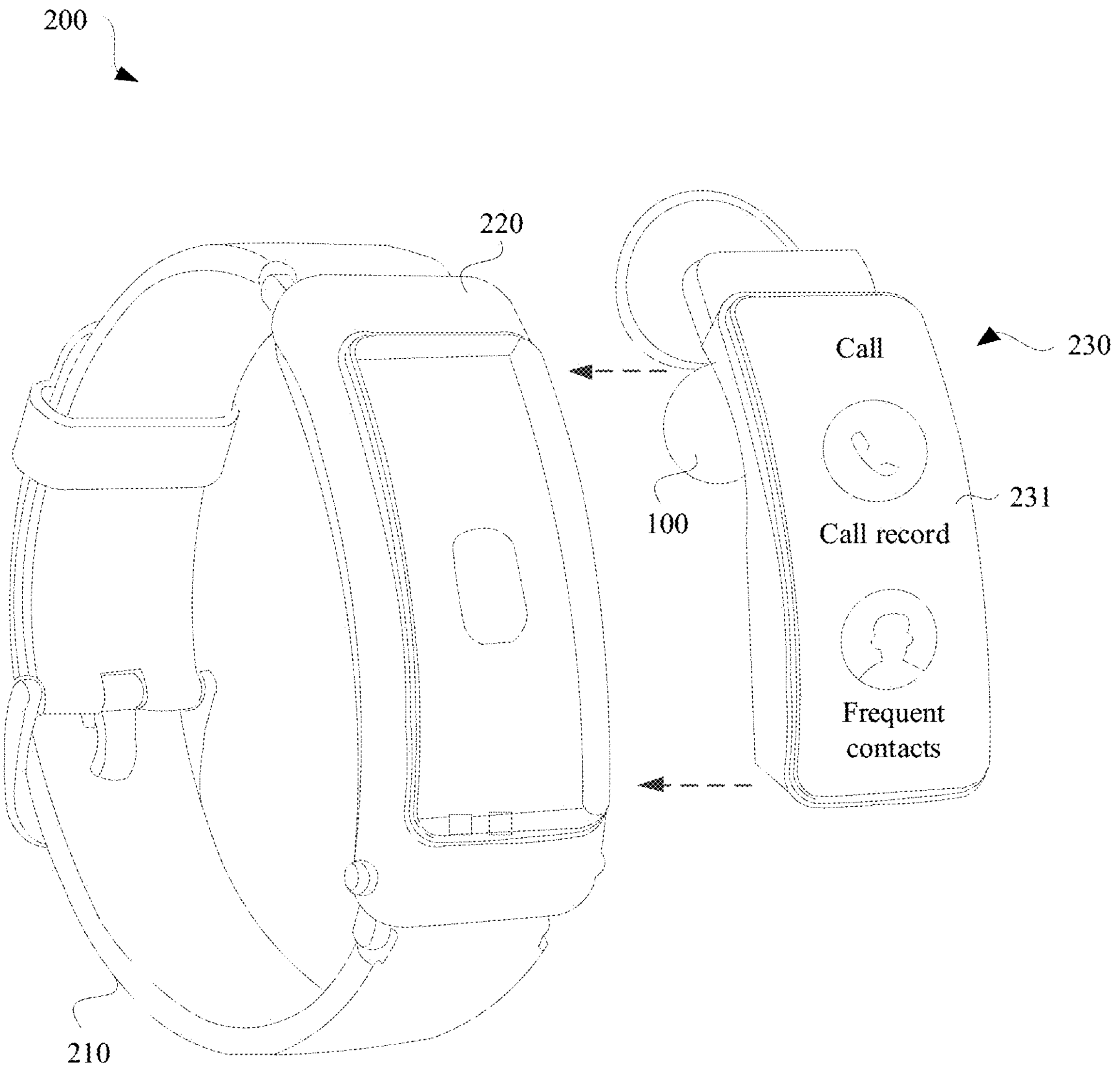
FIG. 12 is an exploded view of FIG. 11.

FIG. 11 is a schematic diagram of a structure of a terminal device according to an embodiment of this application. FIG. 12 is an exploded view of FIG. 11. As shown in FIG. 11 and FIG. 12, the smart wristband 200 includes a wristband 210, a wrist support 220, and a device main body 230. The wristband 210 is disposed on two sides of the wrist support 220, and a user may wear the smart wristband 200 on a wrist by using the wristband 210. The device main body 230 is detachably connected to the wrist support 220, and the device main body 230 includes the earphone 100 in the foregoing embodiments. In this way, the device main body 230 may be used as a Bluetooth earphone. In addition, a display 231 is disposed on an outer side of the device main body 230, so that a display function is integrated into the Bluetooth earphone.

Figure 13:
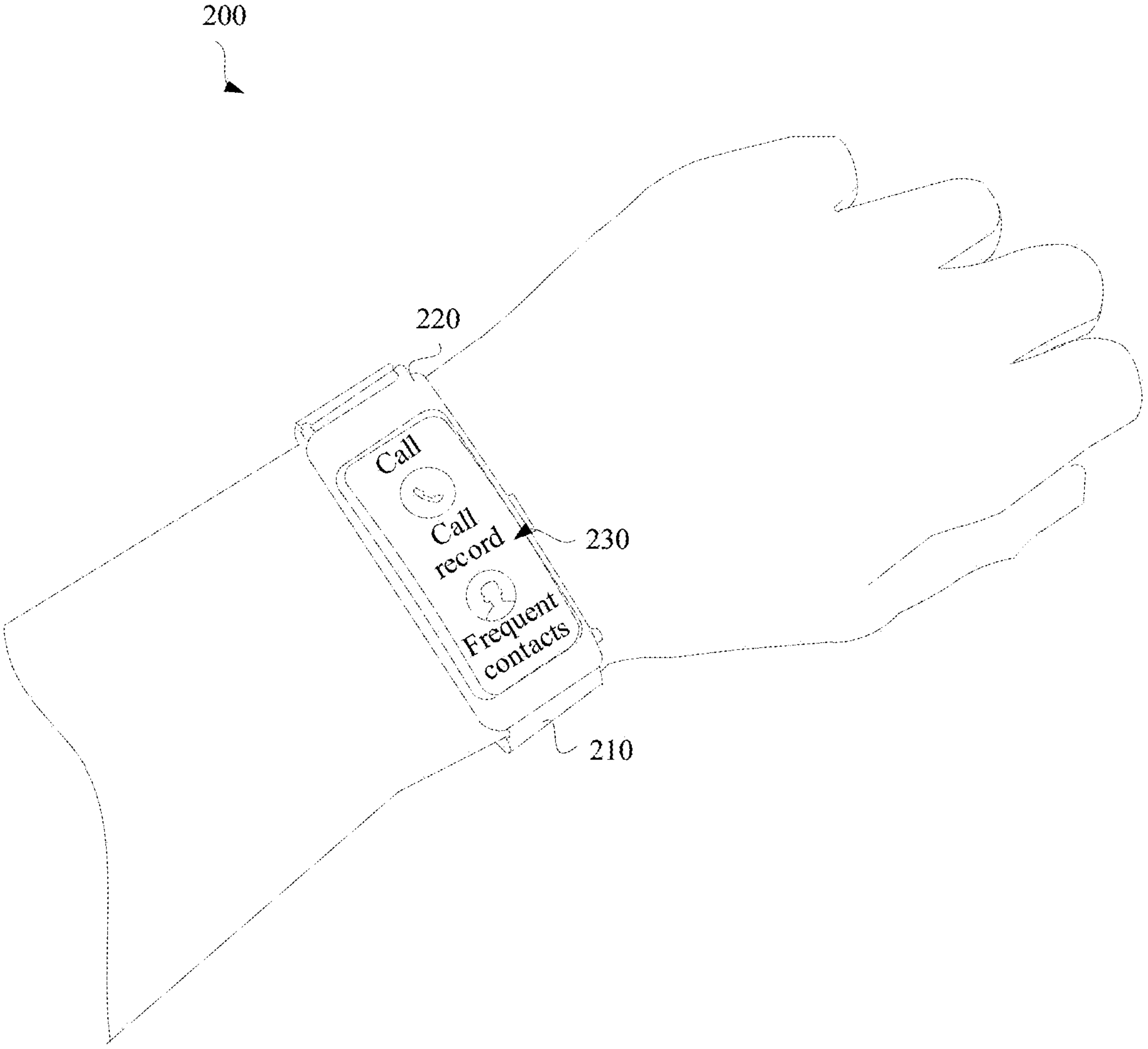
FIG. 13 is a schematic diagram of a use status of a terminal device according to an embodiment of this application.
Figure 14:
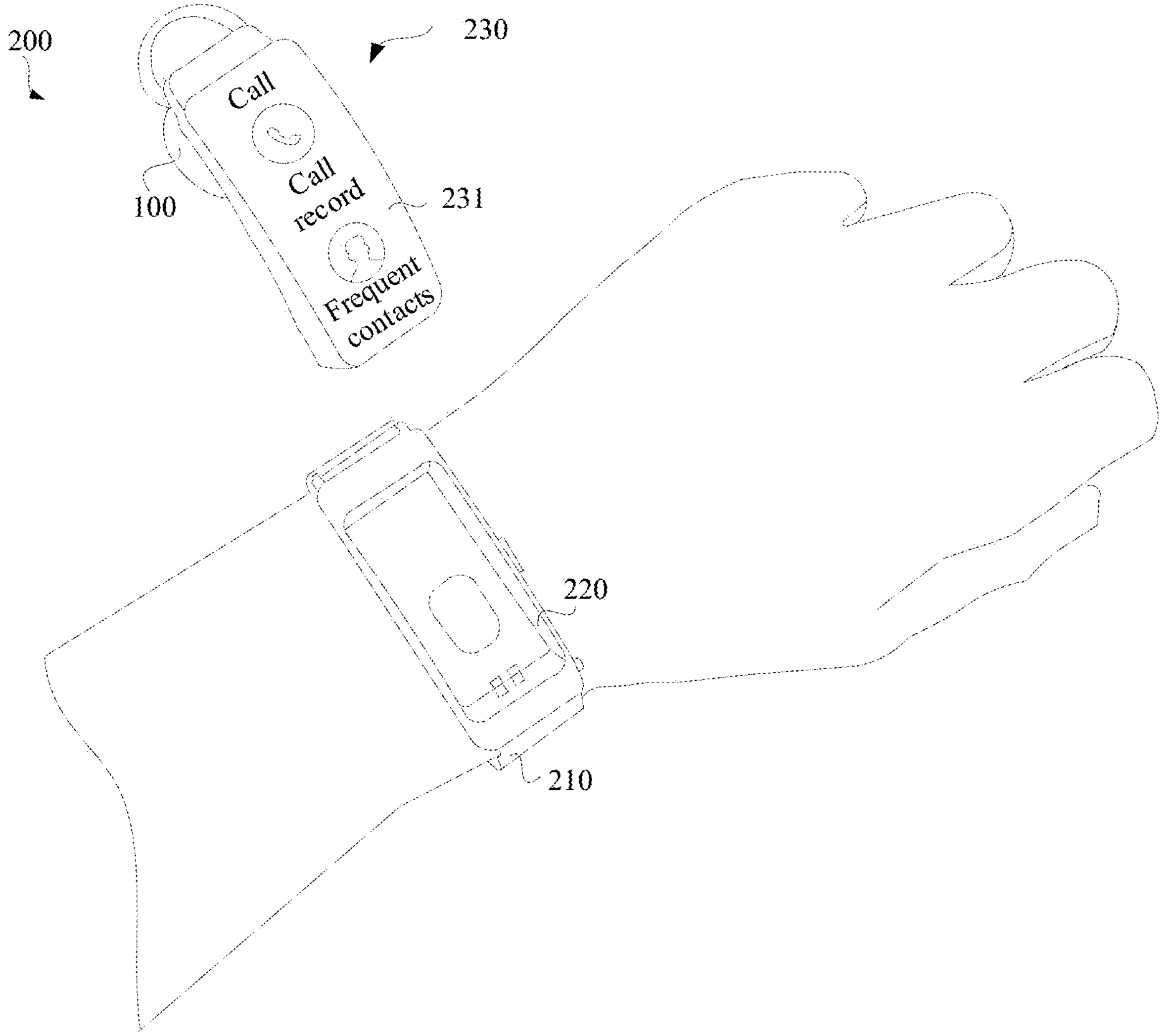
FIG. 14 is a schematic diagram of another use status of a terminal device according to an embodiment of this application.
Figure 15:
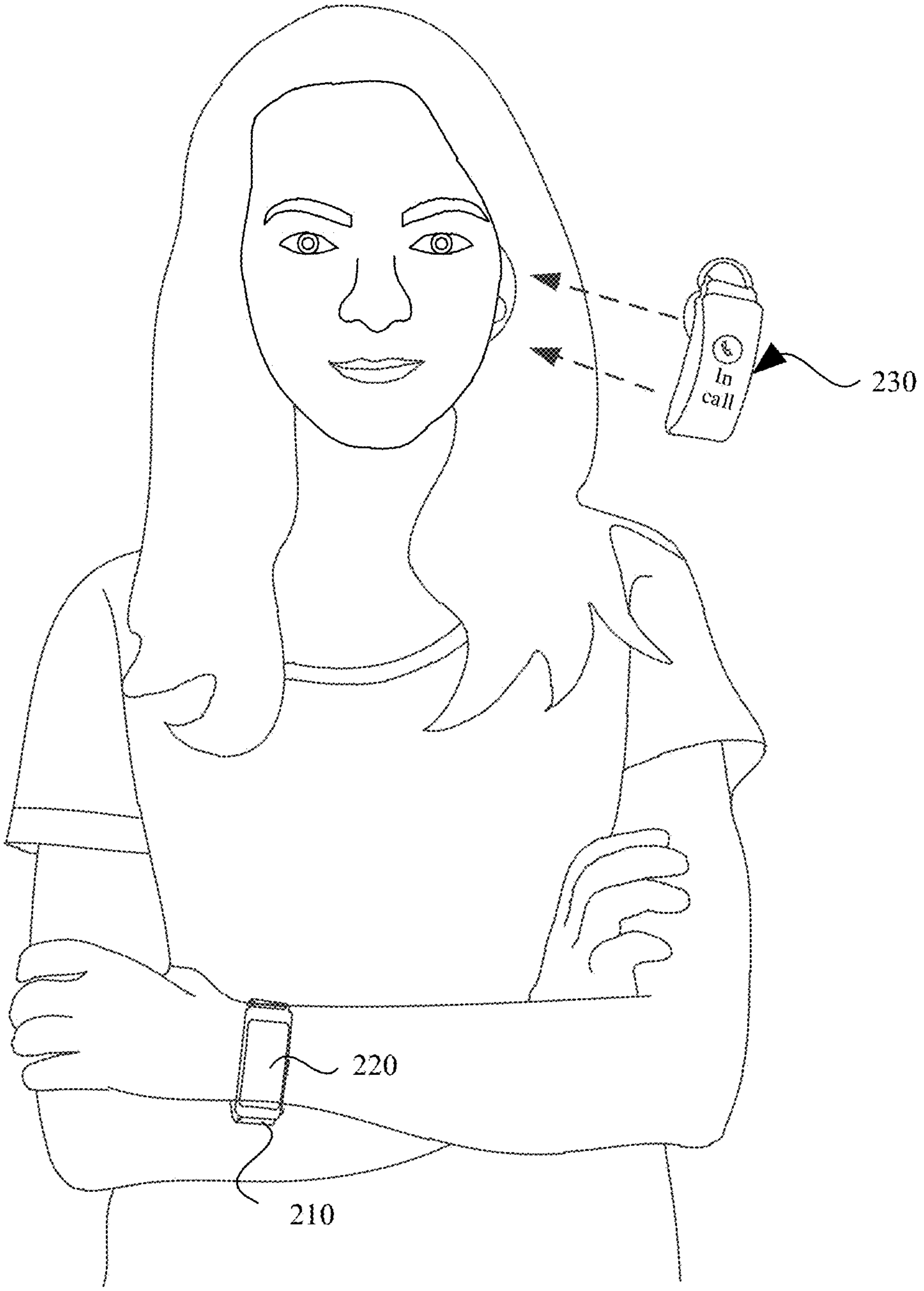
FIG. 15 is a schematic diagram of still another use status of a terminal device according to an embodiment of this application.

FIG. 13 is a schematic diagram of a use status of a terminal device according to an embodiment of this application. As shown in FIG. 13, the user may wear the smart wristband 200 on the wrist by using the wristband 210, so that the device main body 230 monitors various indicators of a body of the user. The smart wristband 200 in this embodiment of this application has a voice call function. When the smart wristband 200 needs to make a voice call, the device main body 230 may be removed from the wrist support 220 (refer to FIG. 14), and then the device main body 230 is worn on an ear of the user by using the earphone 100 (as shown in FIG. 15).

The earphone 100 provided in the first aspect of embodiments of this application is integrated into the device main body 230 of the smart wristband 200 in this embodiment. The first sound production unit 130, the second sound production unit 140, and the third sound production unit 150*a* (namely, the micro-electro-mechanical system unit 150) may be disposed inside the device main body 230. For a specific stacking manner of the first sound production unit 130, the second sound production unit 140, and the third sound production unit 150*a*, refer to the descriptions in embodiments of the earphone 100 provided in the first aspect of embodiments of this application. Details are not described herein again.

According to the terminal device provided in this application, the earphone provided in the first aspect of embodiments of this application is integrated into the terminal device, so that when other performance of the terminal is ensured, sound quality of the terminal device when the terminal device is used as the earphone can be further improved.

In the descriptions of embodiments of this application, it should be noted that, unless otherwise clearly specified and limited, terms “mount”, “link”, and “connect” should be understood in a broad sense. For example, the terms may indicate a fixed connection, an indirect connection through an intermediate medium, communication inside two elements, or an interaction relationship between two elements. A person of ordinary skill in the art may understand specific meanings of the foregoing terms in embodiments of this application based on a specific case.

In the specification, claims, and accompanying drawings of embodiments of this application, the terms “first”, “second", "third", "fourth", and the like (if existent) are intended to distinguish between similar objects but do not necessarily indicate a specific order or sequence.

What is claimed is:

1. An earphone, comprising:

a housing having a cavity structure disposed within, and a sound output port in communication with the cavity structure; and a first sound transducer, a second sound transducer, and a third sound transducer disposed in the cavity structure, wherein:

a sound production frequency of the second sound transducer is greater than a sound production frequency of the first sound transducer and is less than a sound production frequency of the third sound transducer, the third sound transducer is a micro-electro-mechanical system located between the first sound transducer and the sound output port, a surface of the first sound transducer facing the sound output port and a part of an inner wall of the cavity structure form a front cavity, a surface of the first sound transducer facing away from the sound output port and a part of the inner wall of the cavity structure form a rear cavity separated from the front cavity, the third sound transducer is disposed in the front cavity, a surface of the third sound transducer facing the sound output port and a part of an inner wall of the front cavity enclose a first sound output channel in communication with the sound output port, and a part of the inner wall of the front cavity, a surface of the micro-electro-mechanical system facing away from the sound output port, and the surface of the first sound transducer facing the sound output port jointly enclose a middle cavity in communication with the first sound output channel within the cavity structure of the housing.

2. The earphone according to claim 1, wherein:

the sound production frequency of the first sound transducer is less than or equal to 1 kHz;

the sound production frequency of the second sound transducer is between 1 kHz and 6 kHz; and the sound production frequency of the third sound transducer is greater than or equal to 6 kHz.

3. The earphone according to claim 1, wherein:

a second sound output channel is provided between a part of the inner wall of the front cavity and a part of an outer wall of the housing;

a first end of the second sound output channel is in communication with the sound output port;

the second sound output channel and the first sound output channel are separated and provided independently of each other;

a first accommodation space in the cavity structure is capable of accommodating the second sound transducer;

the first accommodation space is in communication with both the rear cavity and a second end of the second sound output channel; and a sound output surface of the second sound transducer faces the second sound output channel.

4. The earphone according to claim 1, wherein:

the first sound output channel comprises a high-frequency sound output channel and a low-frequency sound output channel;

the high-frequency sound output channel and the low-frequency sound output channel are separated and provided independently of each other; and the middle cavity is in communication with the low-frequency sound output channel.

5. The earphone according to claim 4, further comprising a pipe support disposed in the first sound output channel, wherein:

a first end of the pipe support is connected to the third sound transducer in a sealing manner, and a second end of the pipe support extends in a direction close to the sound output port;

a pipe inside the pipe support forms the high-frequency sound output channel; and a part of an outer wall of the pipe support and a part of an inner wall of the first sound output channel enclose the low-frequency sound output channel.

6. The earphone according to claim 5, further comprising a feedback microphone disposed in the first sound output channel and in communication with the sound output port.

7. The earphone according to claim 6, wherein:

a positioning part is disposed on the outer wall of the pipe support;

the feedback microphone is fastened on the positioning part; and a sound pickup port of the feedback microphone is in communication with the low-frequency sound output channel.

8. The earphone according to claim 1, wherein:

a third sound output channel is located between a part of the inner wall of the front cavity and an outer edge of one end of the third sound transducer; and the middle cavity is in communication with the first sound output channel through the third sound output channel.

9. The earphone according to claim 1, wherein:

the second sound transducer is disposed in the first sound output channel; and the second sound transducer is located between the sound output port and the third sound transducer.

10. The earphone according to claim 9, wherein:

a sound pickup channel is located between a part of the inner wall of the front cavity and an outer wall of the housing;

a first end of the sound pickup channel is in communication with the sound output port;

a second accommodation space is disposed in the cavity structure;

the second accommodation space is in communication with both the rear cavity and a second end of the sound pickup channel; and a feedback microphone is disposed in the second accommodation space, and a sound pickup port of the feedback microphone faces the second end of the sound pickup channel.

11. The earphone according to claim 1, wherein:

the housing comprises a front housing assembly and a rear housing assembly connected to the front housing assembly; and one end of the front housing assembly has a sound output nozzle protruding outward, and one end of the sound output nozzle defines the sound output port.

12. The earphone according to claim 11, wherein:

the front housing assembly comprises an inner housing and an outer housing sleeved on the inner housing;

one end of the inner housing protrudes from one end of the outer housing to form the sound output nozzle;

the outer housing is connected to the rear housing assembly; and one end of the inner housing facing away from the sound output nozzle is connected to the first sound transducer.

13. The earphone according to claim 12, wherein:

a channel is provided on one side of the inner housing; and the channel is configured to be used as a sound pickup channel of a feedback microphone, or the channel is configured to be used as a sound output channel of the second sound transducer.

14. The earphone according to claim 12, wherein:

a front vent hole is provided on the front housing assembly;

the front vent hole is in communication with the front cavity; and a front vent channel is formed between the front vent hole and the front cavity.

15. The earphone according to claim 14, wherein:

a rear vent hole is further provided on the front housing assembly;

the rear vent hole communicates with the rear cavity; and a rear vent channel is formed between the rear vent hole and the rear cavity.

16. The earphone according to claim 1, wherein the second sound transducer is a planar film or a balanced armature transducer.

17. The earphone according to claim 1, wherein the first sound transducer is a moving coil transducer.

18. The earphone according to claim 1, wherein the earphone is a wireless Bluetooth earphone.

19. A terminal device, comprising an earphone, wherein the earphone comprises:

a housing having a cavity structure disposed within, and a sound output port in communication with the cavity structure;

a first sound transducer, a second sound transducer, and a third sound transducer disposed in the cavity structure, wherein a sound production frequency of the second sound transducer is greater than a sound production frequency of the first sound transducer and is less than a sound production frequency of the third sound transducer; and the third sound transducer is a micro-electro-mechanical system located between the first sound transducer and the sound output port, a surface of the first sound transducer facing the sound output port and a part of an inner wall of the cavity structure form a front cavity, a surface of the first sound transducer facing away from the sound output port and a part of the inner wall of the cavity structure form a rear cavity separated from the front cavity, the third sound transducer is disposed in the front cavity, a surface of the third sound transducer facing the sound output port and a part of an inner wall of the front cavity enclose a first sound output channel in communication with the sound output port, and a part of the inner wall of the front cavity, a surface of the micro-electro-mechanical system facing away from the sound output port, and the surface of the first sound transducer facing the sound output port jointly enclose a middle cavity in communication with the first sound output channel within the cavity structure of the housing.

20. The terminal device according to claim 19, wherein:

the second sound transducer is disposed in the first sound output channel; and the second sound transducer is located between the sound output port and the third sound transducer.

* * * * *